US009878289B2

(12) United States Patent
Pierik et al.

(10) Patent No.: US 9,878,289 B2
(45) Date of Patent: Jan. 30, 2018

(54) FLUID TREATMENT APPARATUS AND METHOD OF USING SAME

(71) Applicant: Twothirds Water Inc., Vancouver (CA)

(72) Inventors: Bradley S Pierik, Vancouver (CA); Kevin T Reilly, Vancouver (CA); Ronald J Pierik, Holly, MI (US)

(73) Assignee: TAPP GLOBAL DESIGN INC., Vancouver (CA)

( * ) Notice: Subject to any disclaimer, the term of this patent is extended or adjusted under 35 U.S.C. 154(b) by 944 days.

(21) Appl. No.: 14/026,945

(22) Filed: Sep. 13, 2013

(65) Prior Publication Data

US 2014/0076792 A1 Mar. 20, 2014

Related U.S. Application Data

(60) Provisional application No. 61/700,864, filed on Sep. 13, 2012, provisional application No. 61/828,514, (Continued)

(51) Int. Cl.
*B01D 61/14* (2006.01)
*B01D 61/18* (2006.01)
(Continued)

(52) U.S. Cl.
CPC ........... *B01D 61/142* (2013.01); *B01D 61/18* (2013.01); *B01D 63/02* (2013.01); *B01D 65/02* (2013.01);
(Continued)

(58) Field of Classification Search
CPC ............ B01D 2313/10; B01D 2313/13; B01D 2313/18; B01D 2313/20; B01D 2313/44;
(Continued)

(56) References Cited

U.S. PATENT DOCUMENTS 2,456,524 A 5/1944 Meincke, Jr.
5,173,192 A 12/1992 Shalev
(Continued)

FOREIGN PATENT DOCUMENTS

CN 101300062 A 11/2008
WO 2008/101159 8/2008

OTHER PUBLICATIONS

Office Action and Search Report from the State Intellectual Property Office of China for Chinese Patent Application No. 201380057735.1 dated May 26, 2016.
(Continued)

*Primary Examiner* — Pranav N Patel
(74) *Attorney, Agent, or Firm* — Katten Muchin Rosenman LLP

(57) ABSTRACT

A portable or personal water filtration apparatus comprising upstream and downstream removable reservoirs and a back-washable filter interposed therebetween. The back-washable filter comprises an upstream housing and a downstream housing, inside of which are fitted a membrane cartridge and a slidable plunger. The downstream housing is rotatable relative to the upstream housing between two or more positions, including, for example, an open flow position, a closed flow position, and a back-wash position. In the back-wash position, the downstream housing and plunger are axially extendable relative to the upstream housing and membrane cartridge in order to obtain a charge of clean water in the plunger that may then be forced backward through the filter by returning the plunger to its starting position. This dislodges accumulated debris from the membrane and reverses the slowing of flow observed through repeated use of the filter.

20 Claims, 38 Drawing Sheets

(membrane not pictured)

Related U.S. Application Data filed on May 29, 2013, provisional application No. 61/833,310, filed on Jun. 10, 2013.

(51) Int. Cl.
| | | |
|---|---|---|
| *B01D 63/02* | (2006.01) | |
| *B01D 65/02* | (2006.01) | |
| *C02F 1/00* | (2006.01) | |
| *C02F 1/44* | (2006.01) | |

(52) U.S. Cl.
CPC .......... *C02F 1/002* (2013.01); *B01D 2313/10* (2013.01); *B01D 2313/13* (2013.01); *B01D 2313/18* (2013.01); *B01D 2313/20* (2013.01); *B01D 2313/44* (2013.01); *B01D 2321/04* (2013.01); *C02F 1/444* (2013.01); *C02F 2201/005* (2013.01); *C02F 2201/006* (2013.01); *C02F 2307/02* (2013.01)

(58) Field of Classification Search
CPC .. B01D 2321/04; B01D 61/142; B01D 61/08; B01D 63/02; B01D 65/02; C02F 1/002; C02F 1/144; C02F 2201/005; C02F 2201/006; C02F 2307/02

See application file for complete search history.

(56) References Cited

U.S. PATENT DOCUMENTS

| | | | | |
|---|---|---|---|---|
| 5,364,539 | A | | 11/1994 | Castagno |
| 5,567,308 | A | | 10/1996 | Visser |
| 6,245,228 | B1 | * | 6/2001 | Kelada .................... C02F 1/002 |
| | | | | 210/206 |
| 7,604,737 | B2 | | 10/2009 | Francisco |
| 2005/0121382 | A1 | | 6/2005 | Walton |
| 2007/0187306 | A1 | * | 8/2007 | Pecca .................... B01D 35/30 |
| | | | | 210/120 |
| 2007/0246406 | A1 | * | 10/2007 | Dibel .................. B01D 61/142 |
| | | | | 210/96.2 |
| 2008/0035553 | A1 | * | 2/2008 | Brown .................... C02F 1/002 |
| | | | | 210/335 |
| 2008/0197062 | A1 | * | 8/2008 | Collins ................. B01D 63/02 |
| | | | | 210/136 |
| 2008/0203005 | A1 | | 8/2008 | Francisco |
| 2009/0008318 | A1 | * | 1/2009 | Anes ........................ C02F 9/00 |
| | | | | 210/262 |
| 2010/0102002 | A1 | * | 4/2010 | O'Brien ................. C02F 1/002 |
| | | | | 210/668 |
| 2010/0170834 | A1 | * | 7/2010 | Stephens ............... B01D 61/18 |
| | | | | 210/108 |
| 2010/0187183 | A1 | * | 7/2010 | Nelson .................... C02F 1/002 |
| | | | | 210/741 |
| 2012/0292238 | A1 | * | 11/2012 | Wright .................... C02F 1/002 |
| | | | | 210/137 |

OTHER PUBLICATIONS

Transmittal; International Search Report; and the Written Opinion of the international Searching Authority for International Application No. PCT/IB2013/002777, dated Apr. 11, 2014.

* cited by examiner (membrane not pictured)

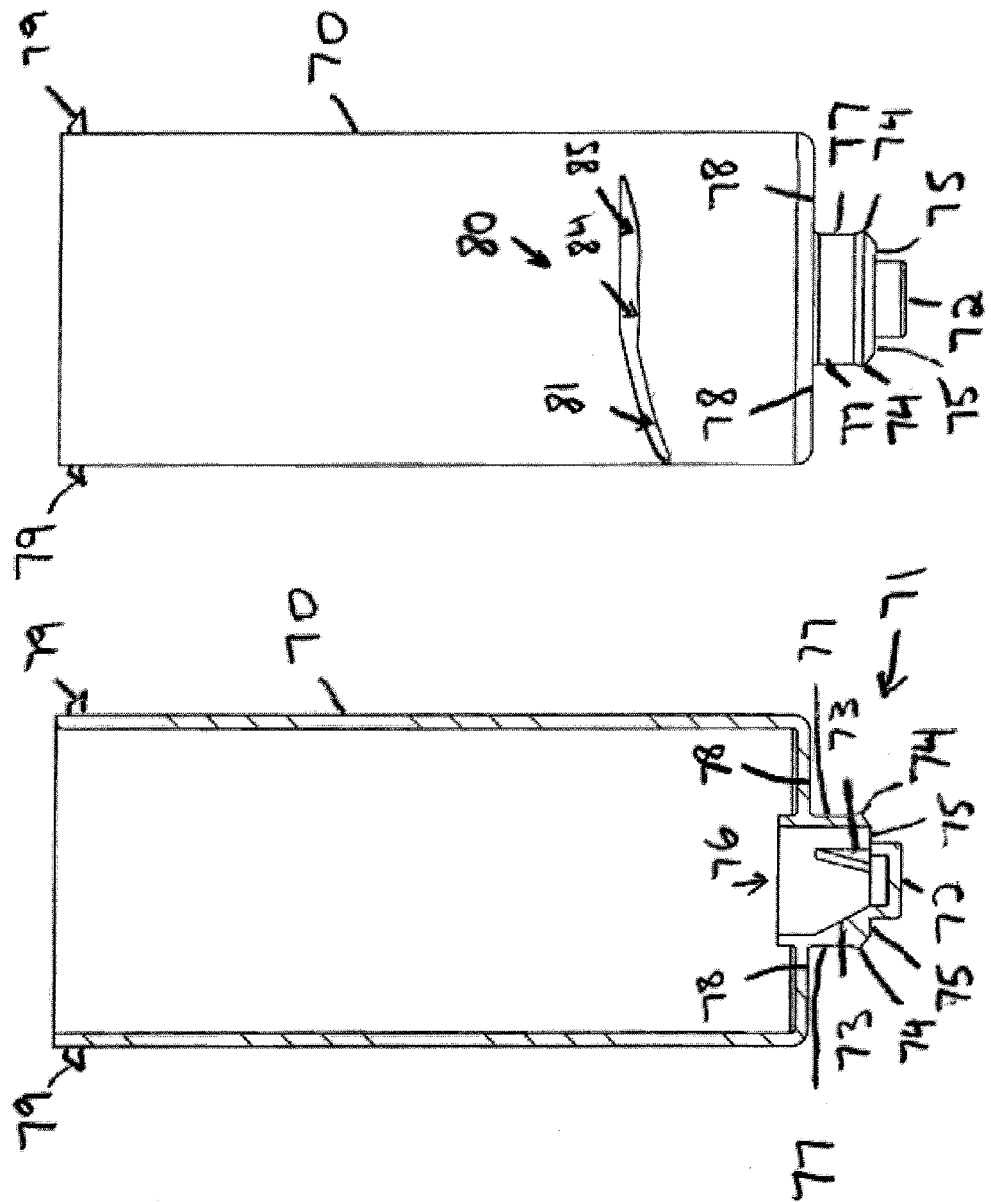

(membrane not pictured)

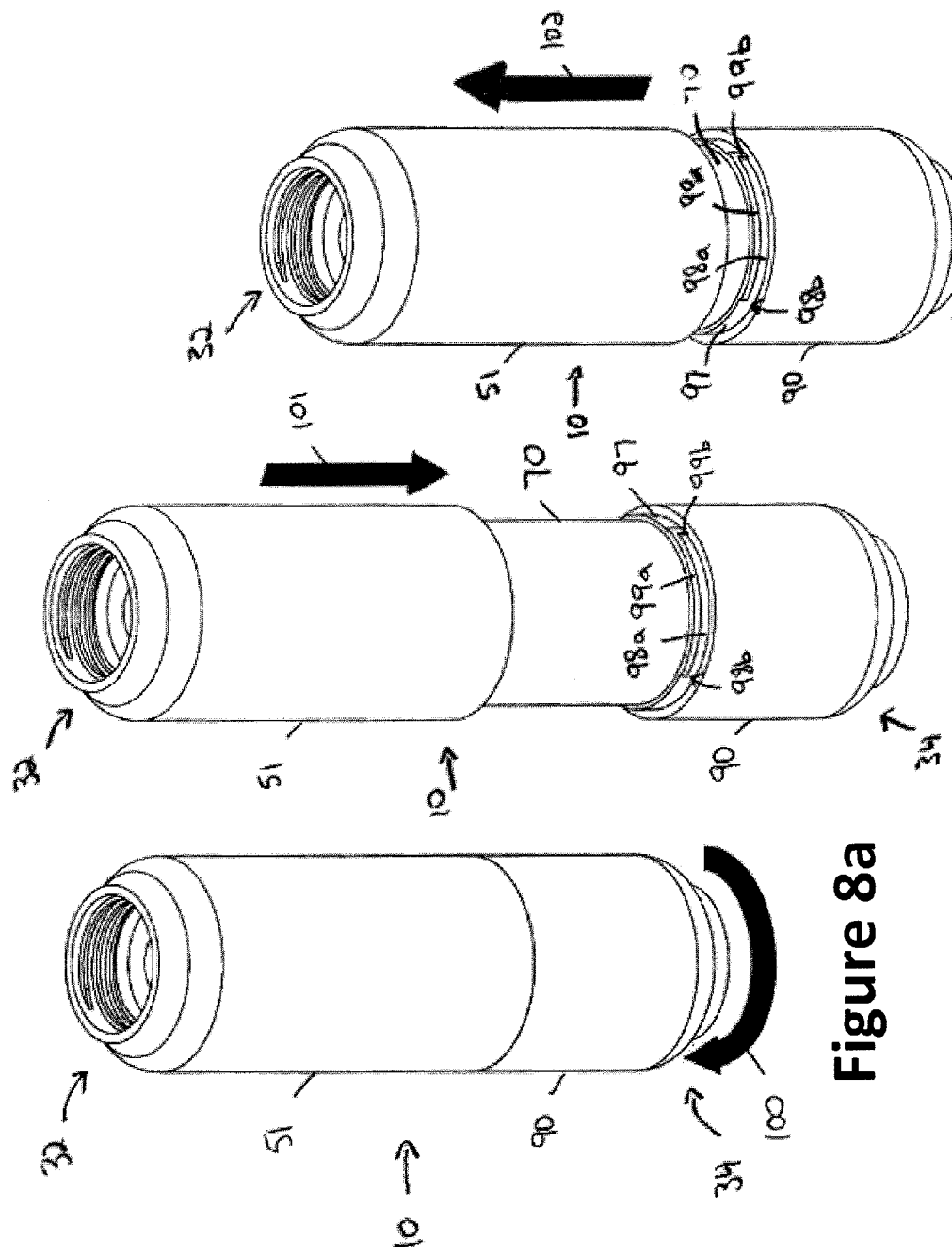

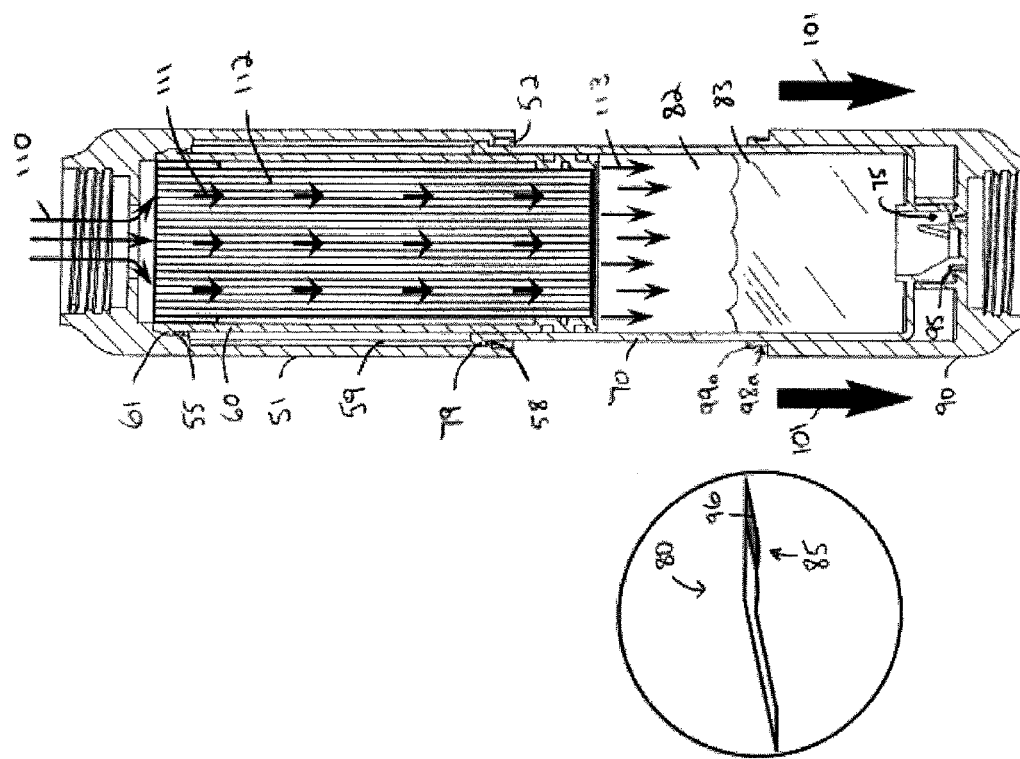

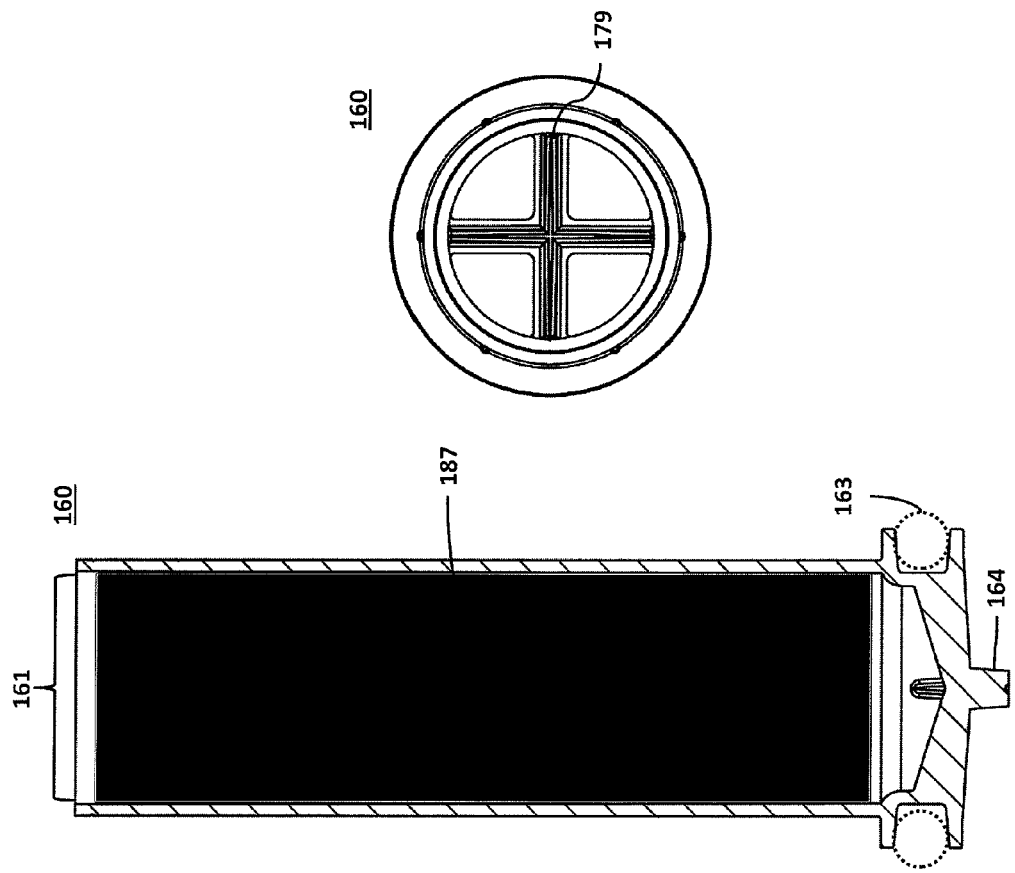
Figure 16c
Figure 16b
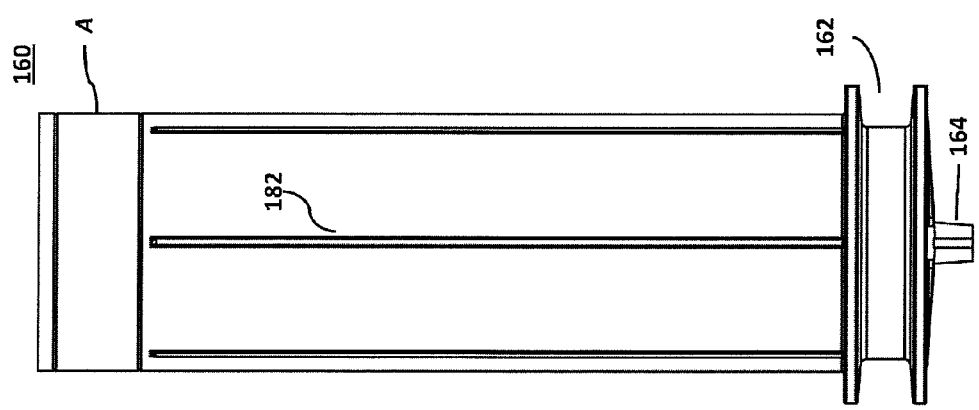
Figure 16a

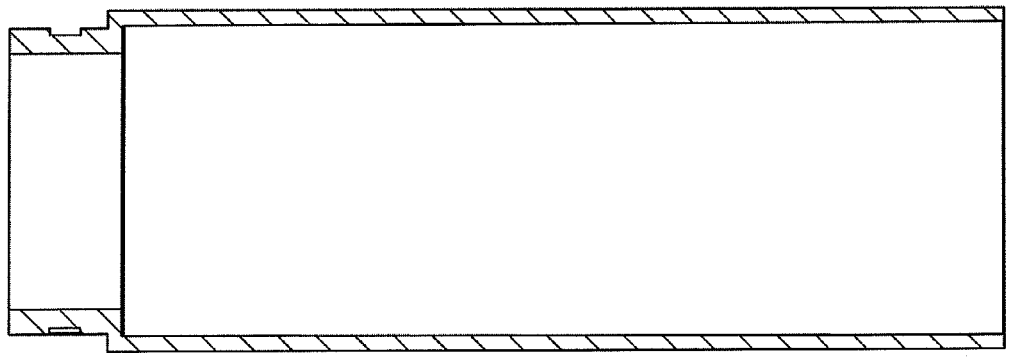
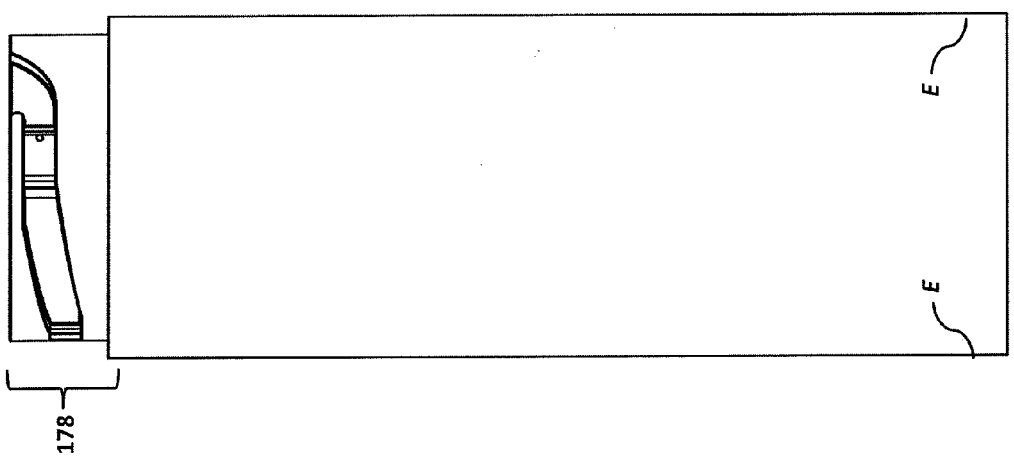

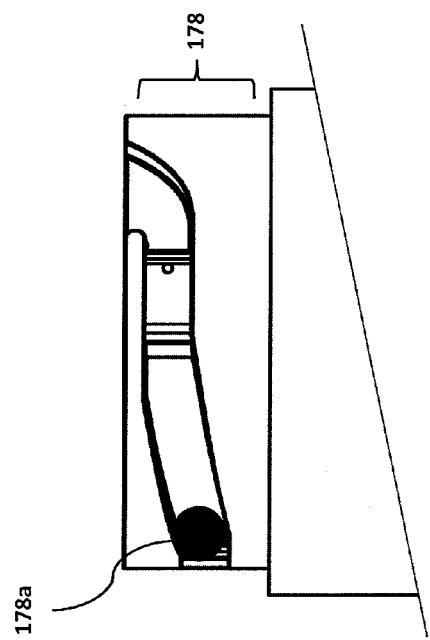
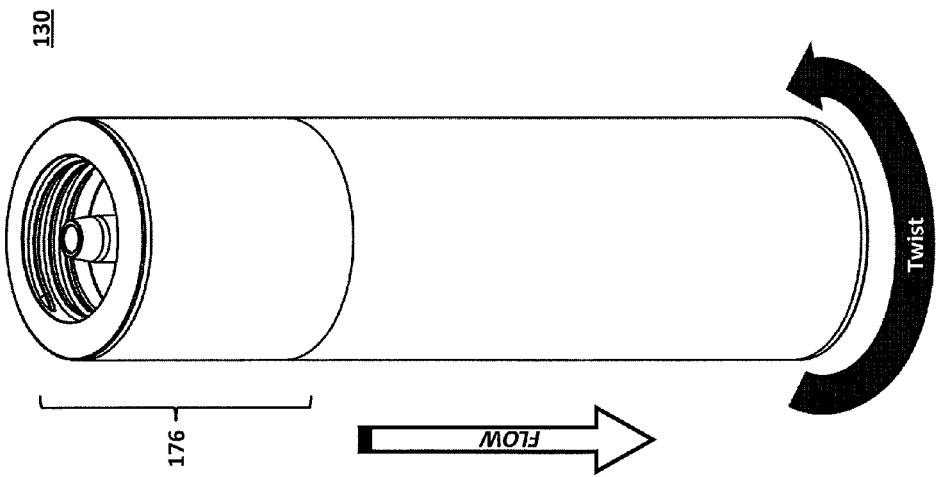
Figure 19b
Figure 19a (membrane not pictured)

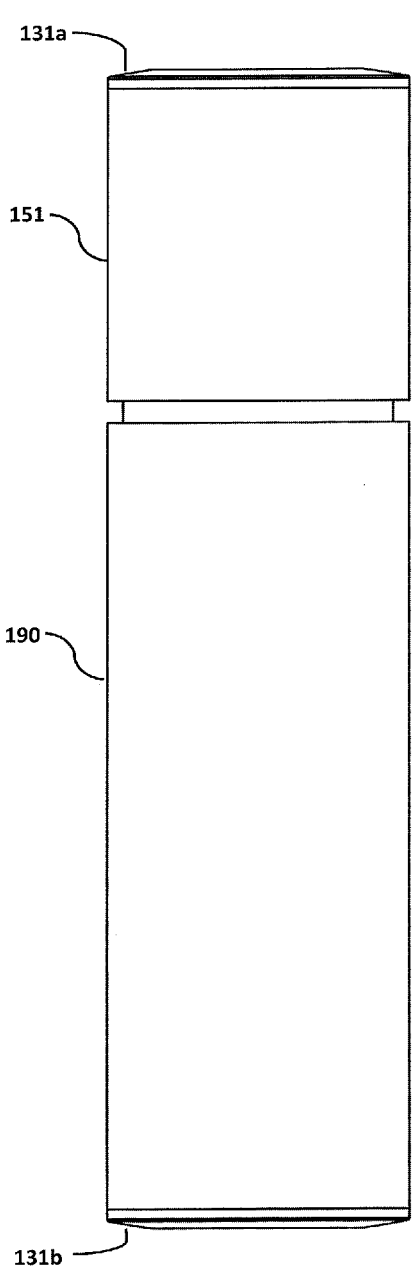
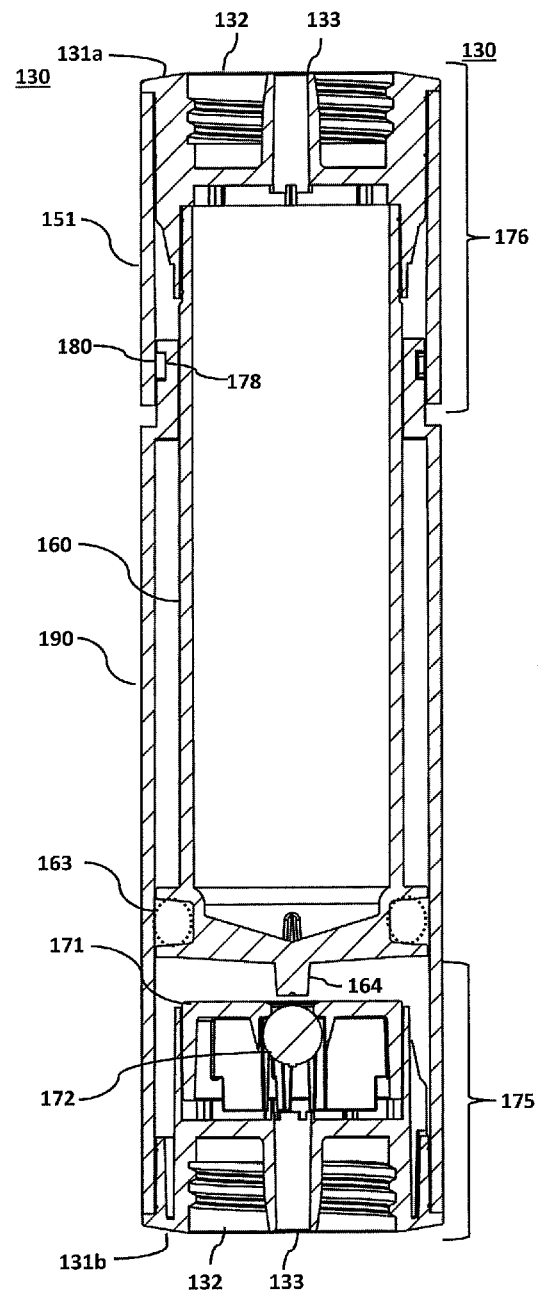
Figure 20c
Figure 20d
(membrane not pictured)

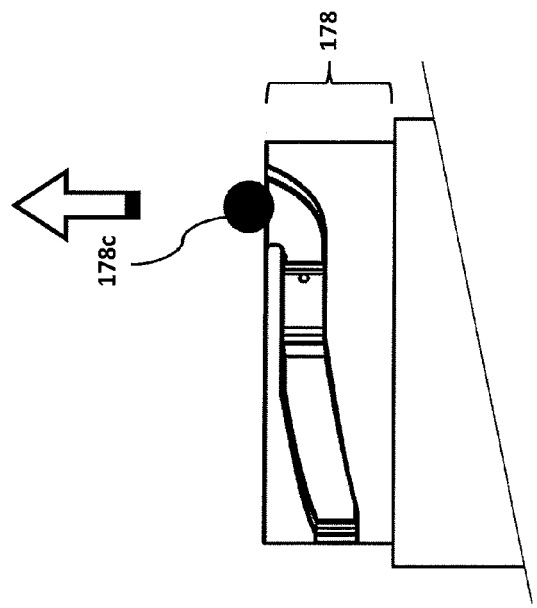
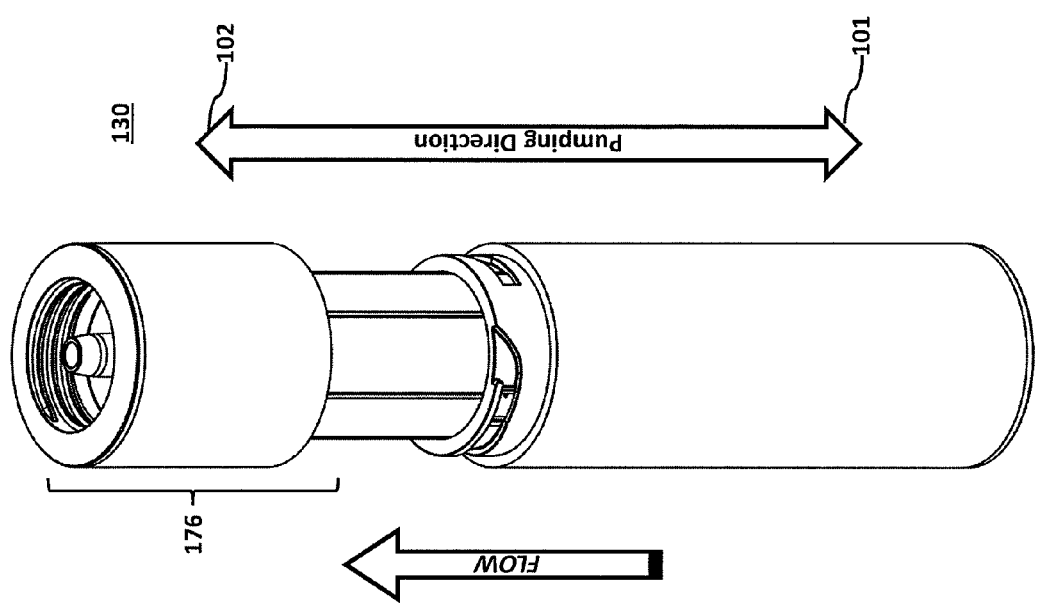
Figure 21b
Figure 21a

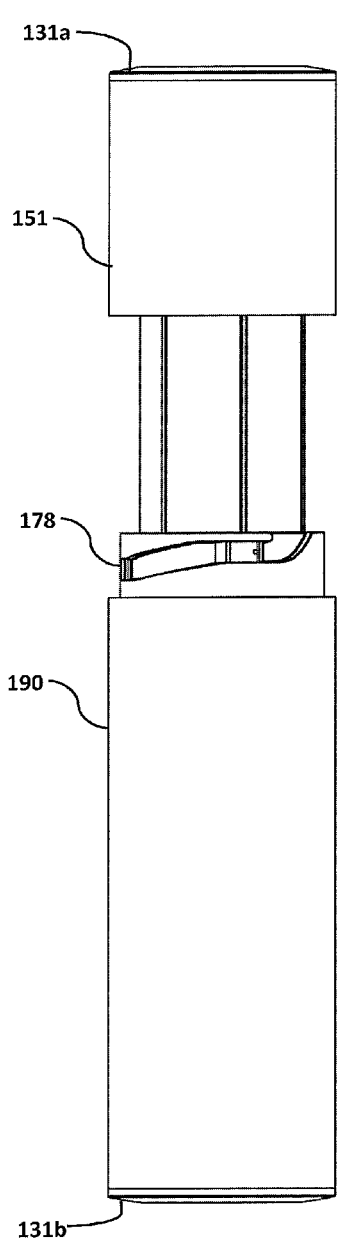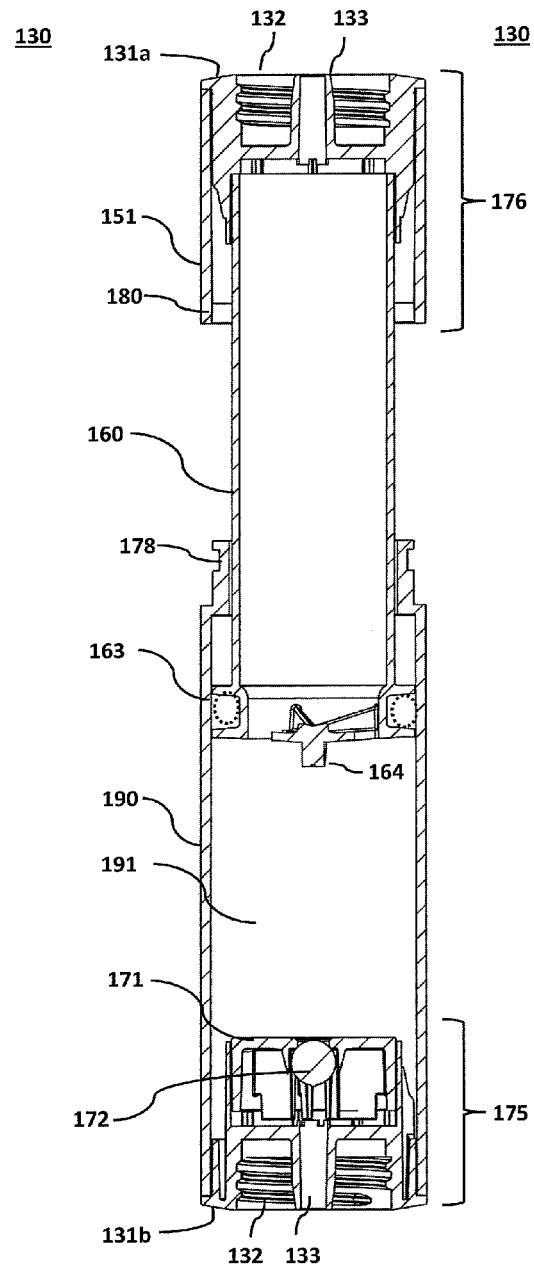
Figure 21c
Figure 21d
(membrane not pictured)

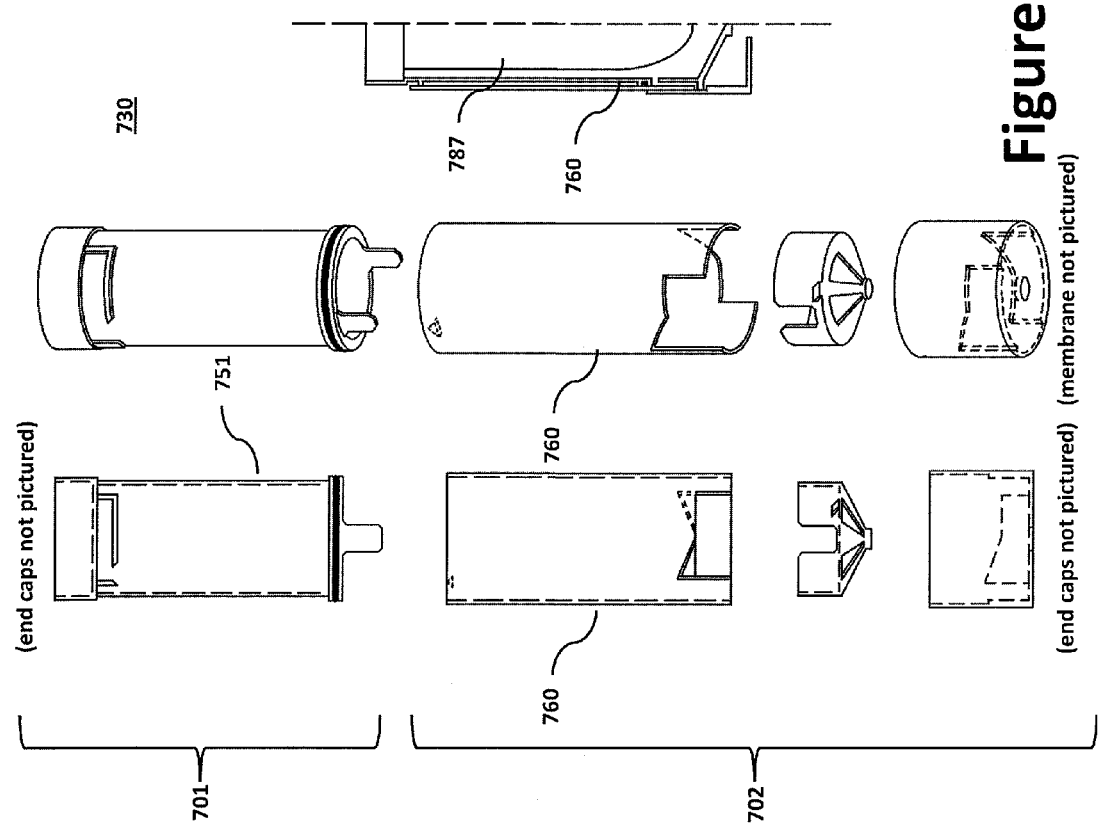

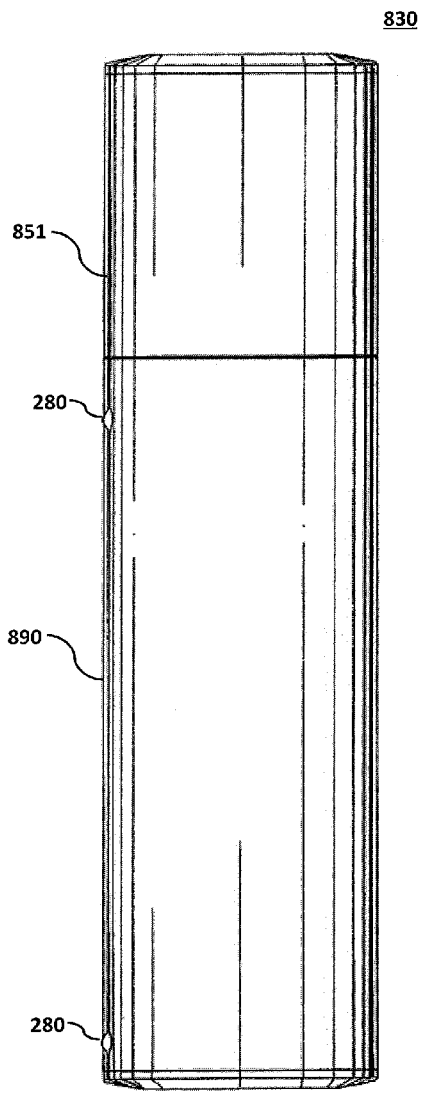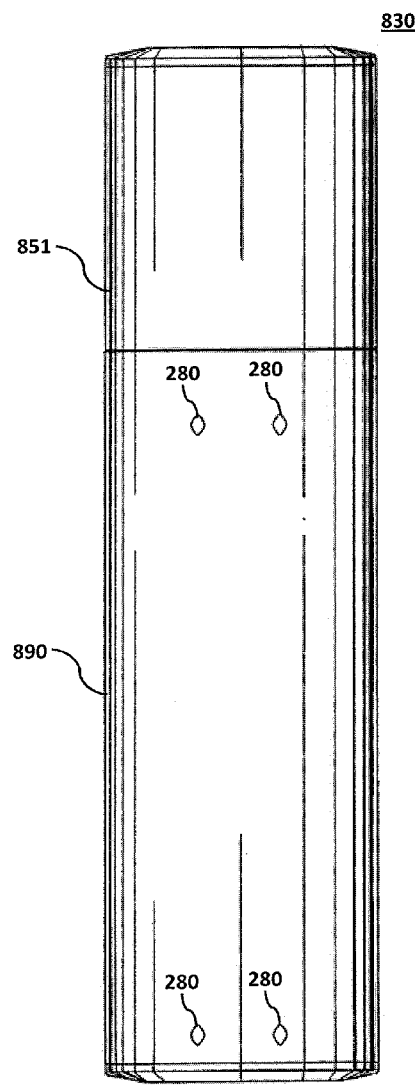
Figure 28b  Figure 28c

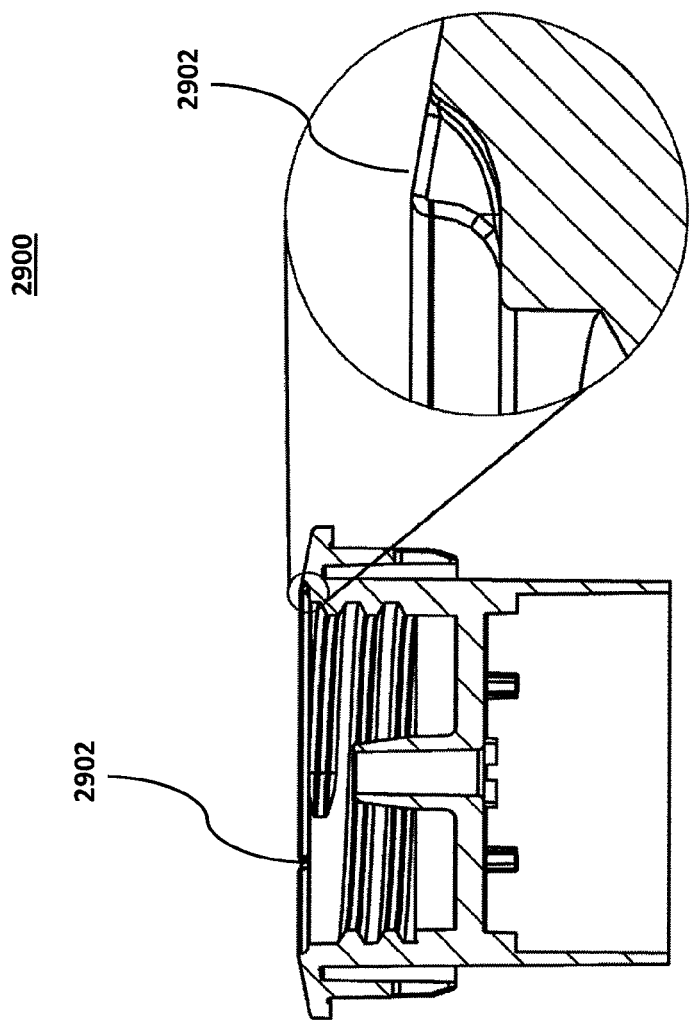
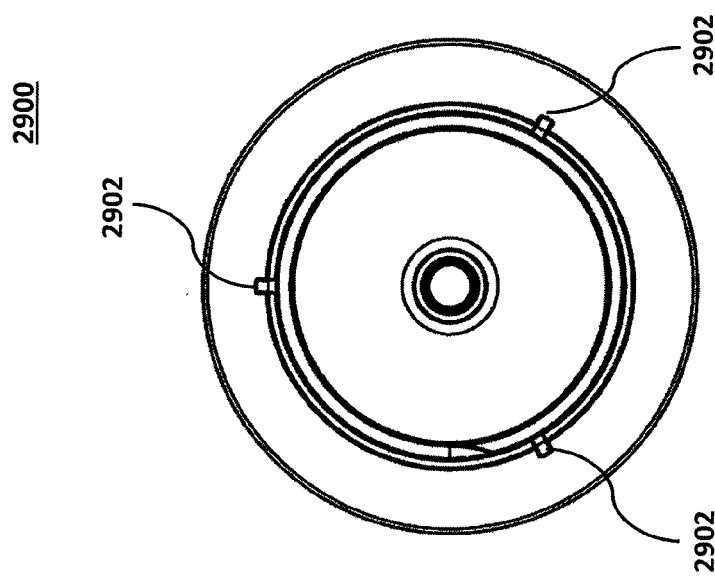
Figure 29b
Figure 29a

FLUID TREATMENT APPARATUS AND METHOD OF USING SAME

CROSS-REFERENCE TO RELATED APPLICATIONS

This application claims priority to U.S. Provisional Patent Application Nos. 61/700,864, filed on Sep. 13, 2012, 61/828,514, filed on May 29, 2013, and 61/833,310, filed on Jun. 10, 2013; each entitled "Fluid Treatment Apparatus And Method Of Using Same," by Bradley Pierik, Kevin Reilly and Ronald Pierik, which are hereby incorporated by reference.

TECHNICAL FIELD

This invention relates to the field of fluid treatment apparatuses and methods of using same. Embodiments of the present invention relate to the field of portable or personal back-washable water filtration apparatuses, water filters therefor, and methods of using same, particularly back-washing methods.

BACKGROUND

Access to clean water is a problem faced by many regions of the world. Water is often treated to remove contaminants before it is consumed. Water filters are commonly used for this purpose.

In developing countries, potable water is often unavailable or difficult to obtain.

People who camp may want a water filter that is portable and easy to use because water is heavy and bulky to carry. Victims of disasters may require filtration devices if sources of treated water are not readily available; the devices need to be stored, transported, and distributed. These scenarios highlight the need for a cheap, portable, and easy-to-use filtration device to provide clean water for these types of applications.

A common problem with existing water filters is that it is difficult to generate sufficient pressure to drive or draw water through the filter. Typically, water filters rely on gravity, incorporate pumps, or require a user's lung power to drive water through the filter. However, each of these means of pressurization has drawbacks. In many parts of the world, pumps are prohibitively expensive or present maintenance challenges. Using gravity to generate pressure requires significant vertical distances to build up head pressure, or else the flow rate is inconveniently slow. It is challenging or impossible for many users, such as children and the elderly, to create sufficient pressure to use a filter with just their lung power. For this reason, a water treatment system with an easier means of generating pressure is needed.

An additional problem with water filtration systems is that the filters are easily blocked with debris and must be cleaned. After a period of use, many filters lose efficiency. Particulate matter filtered out of untreated water might have accumulated and clogged the filter. Efficiency may be restored by periodic back-washing, a process of driving water through the filter in the direction countercurrent to the normal filtering mode to dislodge particles accumulated in the filter and flush them away. Typical cleaning processes involve back-washing the filter by generating pressure in this countercurrent direction with a separate pump or bulb system, or disassembling the system and manually cleaning the filter. Cleaning a filter is often a complex operation and these complexities can be difficult for many users.

The foregoing examples of the related art and limitations related thereto are intended to be illustrative and not exclusive. Other limitations of the related art will become apparent to those of skill in the art upon a reading of the specifications and a study of the drawings.

SUMMARY

The following embodiments and aspects thereof are described and illustrated in conjunction with systems, tools, and methods which are meant to be exemplary and illustrative, not limiting in scope. In various embodiments, one or more of the above-described problems have been reduced or eliminated, while other embodiments are directed to other improvements. In a first aspect of the invention, a fluid treatment system comprises: an upstream portion adapted to convey fluid and to treat impurities within the fluid; and a downstream portion in fluid communication with the upstream portion, wherein the downstream portion comprises a flow valve, and wherein the downstream portion is configured to selectably engage the upstream portion and alternate between, a first engagement position, wherein the flow valve is in an open position, thereby enabling fluid to flow through the downstream portion, and a second engagement position, wherein the flow valve is in a closed position, thereby prohibiting fluid from flowing through the downstream portion, wherein the upstream portion is configured to selectably extend from and retract to the downstream portion, whereby extending the upstream portion from the downstream portion causes fluid to flow through the upstream portion in a downstream direction, whereby an amount of fluid is retained within the downstream portion, and retracting the upstream portion causes said amount of fluid to flow through the upstream portion in an upstream direction.

In a second aspect of the invention, a back-washable fluid treatment apparatus comprises: an upstream portion adapted to convey fluid and to treat impurities within the fluid; and a downstream portion in fluid communication with the upstream portion, wherein the downstream portion comprises a flow valve, and wherein the wherein the downstream portion is configured to selectably engage the upstream portion and alternate between, a first engagement position, wherein the flow valve is in an open position, thereby enabling fluid to flow through the downstream portion, and (1) a second engagement position, wherein the flow valve is in a closed position, thereby prohibiting fluid from flowing through the downstream portion, wherein the upstream portion is configured to selectably extend from and retract to the downstream portion, whereby extending the upstream portion from the downstream portion causes fluid to flow through the upstream portion in a downstream direction, whereby an amount of fluid is retained within the downstream portion, and retracting the upstream portion causes fluid to flow through the upstream portion in an upstream direction.

In certain aspects, extending the upstream portion drives the fluid in the downstream direction and retracting the upstream portion drives the fluid in the upstream direction, thereby (i) backwashing the upstream portion, (ii) clearing bubbles to mitigate risk of an air-lock condition, or (iii) starting a siphon when used in conjunction with a hose in fluid communication with the upstream portion.

In certain aspects, the downstream portion is configured to selectably engage the upstream portion and alternate between a third engagement position, wherein the flow valve is in the closed position, thereby prohibiting fluid from flowing through the downstream portion, wherein the upstream portion is fixedly secured from extending and retracting relative to the downstream portion.

In certain aspects, the downstream portion and the upstream portion alternate between the first engagement position and the second engagement position when the upstream portion is rotated relative to the downstream portion.

In certain aspects, the downstream portion and the upstream portion alternate between the first engagement position and the second engagement position when an intermediate portion positioned between the upstream portion and the downstream portion is rotated relative to the upstream and the downstream portion.

In certain aspects, the upstream portion and the downstream portion are cylindrical in shape and the upstream portion or downstream portion comprise one or more surface protrusions to deter rolling.

In certain aspects, the upstream portion comprises an upstream threaded connector adapted to sealingly connect to an upstream threaded reservoir, and the downstream portion comprises a downstream threaded connector adapted to un-sealingly connect to a downstream threaded reservoir.

In certain aspects, the upstream portion is configured to treat impurities using a microfiltration porous membrane having hydrophilic and hydrophobic fibers.

In certain aspects, the upstream portion is configured to treat impurities using an ultrafiltration porous membrane having hydrophilic and hydrophobic fibers.

In certain aspects, said flow valve is a spring-and-ball valve assembly.

In a third aspect of the invention, a kit for filtering fluid comprises: an upstream reservoir; a downstream reservoir; a membrane cartridge having an upstream end and a downstream end, wherein the membrane cartridge comprises an actuating protrusion at the downstream end; an upstream housing having an upstream end and a downstream end, wherein the downstream end of the upstream housing is fixedly connected to the upstream end of the membrane cartridge and comprises one or more tabs positioned circumferentially along an inner surface of the upstream housing; a downstream housing having an upstream end and a downstream end, wherein the upstream end of the downstream housing is movably connected to the downstream end of the membrane cartridge and comprises one or more shaped slots positioned circumferentially along the downstream housing's outer surface and configured to engage the upstream housing's one or more tabs; wherein the downstream housing is configured to selectably engage the upstream housing and alternate between, (1) a first engagement position that permits fluid to flow through the membrane cartridge, (2) a second engagement position that prevents fluid from flowing and seals the downstream end of the back-washable fluid treatment apparatus, and (3) a third engagement position that allows the upstream housing to disengage from the shaped slots of the downstream housing thereby allowing a user to pump the back-washable fluid treatment apparatus; a valve cap positioned within said downstream housing, said valve cap having a flow valve configured to engage the actuating protrusion at the downstream end of the membrane cartridge.

In certain aspects, (i) the upstream housing may comprise an inlet for receiving fluid and an interior threaded portion around said inlet configured to provide a sealing engagement between said upstream housing and the upstream reservoir; and (ii) the downstream housing may comprise an outlet for discharging fluid and an interior threaded portion around said outlet configured to provide an un-sealing engagement between said downstream housing and the downstream reservoir.

In a fourth aspect of the invention, a back-washable fluid filtration system comprises: a top cap assembly having an upstream end and a downstream end, the top cap assembly comprising; one or more tabs positioned circumferentially along an inner surface of the top cap assembly; a membrane cartridge portion configured to house a water treatment material; and an actuating protrusion at the downstream end; a downstream assembly having an upstream end and a downstream end, the downstream assembly comprising: one or more shaped slots positioned circumferentially along the downstream assembly's outer surface and configured to engage the top cap assembly's one or more tabs; and a valve cap portion having a flow valve configured to engage the actuating protrusion of the membrane cartridge portion; wherein the downstream assembly is movably coupled with the top cap assembly and configured to selectably engage the top cap assembly via the shaped slots and alternate between, (1) a first engagement position that permits fluid to flow through the water treatment material, (2) a second engagement position that prevents fluid from flowing and seals the downstream end of the back-washable fluid filtration system, and (3) a third engagement position that allows the upstream housing to disengage from the shaped slots of the downstream housing thereby allowing a user to pump the back-washable fluid filtration system.

In a fifth aspect of the invention, a back-washable fluid filtration apparatus may comprises: a membrane cartridge having an upstream end and a downstream end, wherein the membrane cartridge comprises an actuating protrusion at the downstream end; an upstream housing having an upstream end and a downstream end, wherein the downstream end of the upstream housing is fixedly connected to the upstream end of the membrane cartridge and comprises one or more tabs positioned circumferentially along an inner surface of the upstream housing; an upstream end cap fixedly connected to the upstream end of the upstream housing; a downstream housing having an upstream end and a downstream end, wherein the upstream end of the downstream housing is movably connected to the downstream end of the membrane cartridge and comprises one or more shaped slots positioned circumferentially along the downstream housing's outer surface and configured to engage the upstream housing's one or more tabs; wherein the downstream housing is configured to selectably engage the upstream housing and alternate between, (1) a first engagement position that permits fluid to flow through the water treatment material, (2) a second engagement position that prevents fluid from flowing and seals the downstream end of the back-washable fluid filtration apparatus, and (3) a third engagement position that allows the upstream housing to disengage from the shaped slots of the downstream housing thereby allowing a user to pump the back-washable fluid filtration apparatus; a downstream end cap fixedly connected to the downstream end of the downstream housing; and a valve cap positioned within said downstream housing, said valve cap having a flow valve configured to engage the actuating protrusion at the downstream end of the membrane cartridge.

In certain aspects, the upstream end of said top cap assembly may provide an inlet for receiving water. The upstream end may further comprise an interior threaded portion, around said inlet, configured to provide a sealing engagement between said top cap assembly and a first reservoir, that is, a connection providing fluid communication such that fluid cannot leak out between the connected surfaces. The top cap assembly may further comprise one or more small notches around an outside edge of the threaded portion for providing an air pathway, such that the threads may un-sealingly connect to a reservoir, that is, a connection providing fluid communication such that fluid can leak out between the connected surfaces.

In certain aspects, the downstream end of said downstream assembly provides at least an outlet for discharging water. The downstream assembly may further comprise an interior threaded portion, around said outlet, configured to provide a sealing engagement between said downstream assembly and a second reservoir. The downstream assembly may further comprise one or more small notches around an outside edge of the threaded portion for providing an air pathway.

In certain aspects, the water treatment material is a hollow-fiber membrane filter bundle.

In certain aspects, the downstream assembly comprises one or more surface protrusions on an outer surface of the downstream assembly to deter rolling.

In certain aspects, the flow valve is a spring-and-ball valve assembly.

In addition to the exemplary aspects and embodiments described above, further aspects and embodiments will become apparent by reference to the drawings and by study of the following detailed descriptions.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

FIG. 5A shows a side cross-sectional view of the plunger of the first water filter.

FIG. 5B shows a side view of the plunger of the first water filter.

FIGS. 8A-8C illustrate a sequence of operations involved in back-washing the first water filter.

FIG. 11A shows a side cross-sectional view of the first water filter illustrating a third flow configuration of the water filter.

FIG. 11B illustrates a third engagement position of the tab in the shaped slot of the plunger when the first water filter is in the third flow configuration.

FIG. 16A illustrates a side view of a membrane cartridge of the second water filter.

FIG. 16B illustrates a cross-sectional view of the membrane cartridge of the second water filter.

FIG. 16C illustrates a top plan view of the membrane cartridge of the second water filter.

FIG. 18A illustrates a side view of a downstream housing of the second water filter having a first guide channel design.

FIG. 18B illustrates a cross-sectional view of the downstream housing of the second water filter.

FIG. 19A illustrates a perspective view of the second water filter in an open position.

FIG. 19B illustrates a first engagement position of the tab in the shaped slot when the second water filter is in an open position.

FIG. 20C illustrates a side view of the second water filter in a closed position.

FIG. 20D illustrates a cross-sectional view of the second water filter in a closed position.

FIG. 21A illustrates a perspective view of the second water filter in an unlocked position.

FIG. 21B illustrates a third engagement position of the tab in the shaped slot when the second water filter is in an unlocked position.

FIG. 21C illustrates a side view of the second water filter in an unlocked position.

FIG. 21D illustrates a cross-sectional view of the second water filter in an unlocked position.

FIG. 27 illustrates an eighth embodiment of a water filter of the water filtration device.

FIGS. 28a-28e illustrate an embodiment of a water filter having surface protrusions.

FIGS. 29a-29b illustrate an embodiment of a water filter having anti-seal notches.

DESCRIPTION

Figure 1:
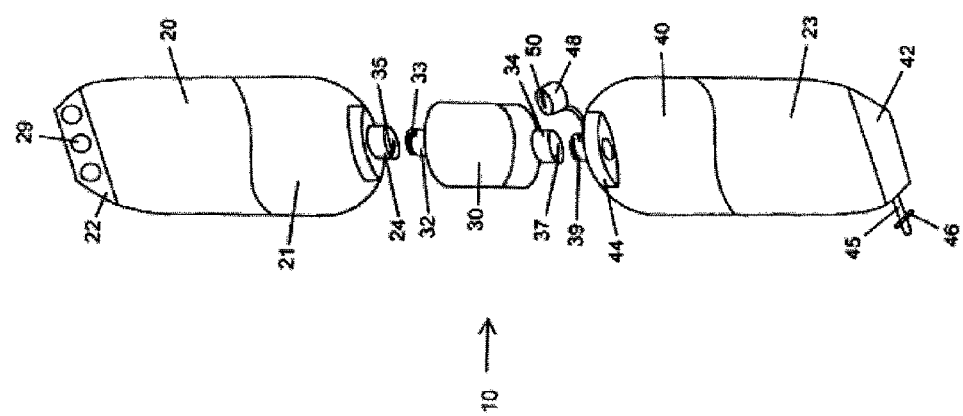
FIG. 1 is a perspective view of a water filtration device according to one embodiment of the invention.

Throughout the following description, specific details are set forth in order to provide a more thorough understanding to persons skilled in the art. However, well-known elements may not have been shown or described in detail to avoid unnecessarily obscuring the disclosure. Accordingly, the description and drawings are to be regarded in an illustrative, rather than a restrictive, sense. Like features of certain embodiments may be referenced in connection with other embodiments by like reference numerals. Accordingly, not all reference numerals shown in a particular drawing will necessarily be described in connection with that drawing.

As used herein, the terms "treat" and "filter" are used to refer to the process of removing or inactivating contaminants in fluid. In some embodiments, membranes, such as microfiltration membranes, or ultrafiltration membranes, are used. Microfiltration membranes may refer to membranes having pores in the range of 0.1 to 10 microns. Ultrafiltration membranes may refer to membranes having pores in the range of 0.001 to 0.1 microns. In some embodiments, activated carbon is used. In some embodiments, a chemical water treatment technology, such as chlorination, is used. In some embodiments, a radiative water treatment technology, such as ultraviolet light, is used. In some embodiments, a combination of multiple water treatment technologies is used.

As used herein, the terms "personal water filter" and "portable water filter" are used to refer to a device that is small enough to be easily carried and used by a single person, e.g., as distinguished from larger water filtration units that would generally be difficult to move and would provide filtered water for a large number of people. The amount of water that can be filtered before back-wash is required is a function of incoming water quality and user preference for an acceptable throughput as a function of time. In some embodiments, a personal water filter can produce sufficient quantities of filtered water to conveniently serve the filtered water needs of between one and eight people on a daily basis for a period of from 1-30 days, 1-12 months, 1-3 years, or any period therebetween.

As used herein, the term "downstream" means the direction in the typical direction of flow through a filter. The term "upstream" means the opposite of downstream, i.e., a direction opposite to the typical direction of flow through a filter. When functioning under the influence of gravity, the typical direction of flow through the filter is from an elevated upstream reservoir to a relatively lowered downstream reservoir.

FIG. 1 shows a water treatment device 10 according to one embodiment of the invention. Water treatment device 10 includes a first reservoir 20, a filter cartridge 30 and second reservoir 40. First reservoir 20 is positioned upstream of filter cartridge 30 and is intended to contain unfiltered water 21. Second reservoir 40 is positioned downstream of filter cartridge 30 and is intended to receive filtered water 23. First reservoir 20 and second reservoir 40 are either directly or indirectly connected to filter cartridge 30. When directly connected, there are no fluid conduits or hoses interposing first reservoir 20 and filter cartridge 30 or second reservoir 40 and filter cartridge 30, as shown. When indirectly connected, such hoses may be provided, as further described hereinafter.

In some embodiments, first and second reservoirs 20, 40 are designed to be durable under repeated manual application of pressure, either through squeezing, rolling, or folding. In some embodiments, the material used to make first and second reservoirs 20, 40 is flexible, and is designed to withstand numerous squeezing cycles, while still functioning effectively to provide water containment and safe storage of filtered water. In some embodiments, the material used to make first and second reservoirs 20, 40 is sufficiently strong to withstand the interior pressure generated when first and second reservoirs 20, 40 are squeezed firmly by a user. In some embodiments, first and second reservoirs 20, 40 are made from a flexible non-porous material such as a rupture-resistant plastic. Examples of potentially suitable plastics that could be used to make first and second reservoirs 20, 40 include polyethylene, polypropylene, thermoplastic polyurethane, and laminates or co-extrusions in which several materials are layered together.

In some embodiments, the material used to make first and second reservoirs 20, 40 is transparent, so that a user can see both the unfiltered water 21 and the filtered water 23. This may provide a user with visual confirmation that filter cartridge 30 is effectively treating the unfiltered water 21.

Filter cartridge 30 may contain any suitable water treatment technology to treat contaminated or potentially contaminated water so that it is potable (i.e., safe to drink). In some embodiments, membranes, such as microporous membranes, or ultrafiltration membranes, are used in filter cartridge 30. Microfiltration membranes may refer to membranes having pores in the range of 0.1 to 10 microns, Ultrafiltration membranes may refer to membranes having pores in the range of 0.001 to 0.1 microns. In some embodiments, activated carbon is used in filter cartridge 30. In some embodiments, a chemical water treatment technology, such as chlorination, is used in filter cartridge 30. In some embodiments, a radiative water treatment technology, such as ultraviolet light, is used in the filter cartridge 30. In some embodiments, a combination of multiple water treatment technologies is used in filter cartridge 30.

In the illustrated embodiment, first reservoir 20 includes a downstream opening 24 and a rigid member 22. The downstream opening 24 is sized and configured to sealingly engage with an upstream receiving portion 32 at the upstream end of filter cartridge 30. Opening 24 can sealingly engage with upstream receiving portion 32 in any suitable manner, for example, by friction fit, threaded engagement, or via a coupling that sealingly connects opening 24 with upstream receiving portion 32. In the illustrated embodiment, upstream receiving portion 32 includes an upstream threaded portion 33 and opening 24 includes a complementary threaded portion 35. Threaded portions 33 and 35 are dimensioned and configured to provide a sealing engagement between first reservoir 20 and filter cartridge 30.

The embodiments in which opening 24 is detachably coupled to filter cartridge 30 allow first reservoir 20 to be easily detached for convenient storage, cleaning, or replacement of first reservoir 20. In some embodiments, in which opening 24 is detachably coupled to filter cartridge 30, a cap or other suitable closure may be provided so that water can be contained within first reservoir 20.

In the illustrated embodiment, second reservoir 40 includes an upstream opening 44, a rigid member 42, and a downstream outlet 45. In some embodiments, including the illustrated embodiment, downstream outlet 45 includes a flow controller 46.

The upstream opening 44 is sized and configured to sealingly engage with a downstream receiving portion 34 at the downstream end of the filter cartridge 30. Upstream opening 44 can sealingly engage with downstream receiving portion 34 in any suitable manner, for example by friction fit, threaded engagement, or via a coupling that sealingly connects upstream opening 44 with downstream receiving portion 34. In the illustrated embodiment, downstream receiving portion 34 includes an interior downstream threaded portion 37 and opening 44 includes a complementary exterior threaded portion 39. Threaded portions 37 and 39 are dimensioned and configured to provide a sealing engagement between second reservoir 40 and filter cartridge 30. Similar structure may be provided in connection with upstream reservoir 20.

Embodiments in which upstream opening 44 is detachably coupled to filter cartridge 30 allow second reservoir 40 to be easily detached for convenient storage, cleaning, or replacement of second reservoir 40. In some embodiments, in which upstream opening 44 is detachably coupled to filter cartridge 30, a cap or other suitable closure is provided so that water can be contained within first reservoir 20. For example, a screw cap 48 may be provided that has a threaded interior surface 50. Threaded interior surface 50 is dimensioned and configured to sealingly engage with upstream opening 44.

In some embodiments, the downstream opening 24 and the upstream opening 44 are sized and/or configured so that the upstream reservoir 20 (e.g., a first reservoir) and the downstream reservoir 40 (e.g., a second reservoir) cannot be interchanged. One embodiment may have upstream receiving portion 32 include an exterior threaded portion and opening 24 include a complementary interior threaded portion, while downstream receiving portion 34 includes interior threaded portion 37 and opening 44 includes complementary exterior threaded portion 39. This may be advantageous because it reduces the risk of accidentally switching the upstream reservoir and the downstream reservoir, and thus reduces the risk of cross-contamination.

In some embodiments, the threaded portions of filter cartridge 30 are dimensioned and configured to engage with conventional liquid storage containers, such as pop bottles or water bottles. In some embodiments, the downstream outlet 45 is dimensioned and configured to engage with conventional liquid storage containers, such as pop bottles or water bottles. Such embodiments allow water treatment device 10 to conveniently provide filtered water for storage in containers that are available to users.

Rigid members 22 and 42 are optional features. In those embodiments that include rigid member 22 and/or 42, rigid members 22 and 42 can be used to facilitate use of water treatment device 10 by allowing a user to easily roll portions of first reservoir 20 or second reservoir 40 over rigid member 22 or 42, to allow the user to provide greater squeezing force against liquid contained therein. In a water-filtering mode (i.e., while water is being passed through filter cartridge 30 in the conventional direction to produce filtered water), the user can more easily apply force to squeeze unfiltered water 21 through filter cartridge 30 and into second reservoir 40, thereby producing filtered water more rapidly. In a filter cleaning mode (i.e., while filtered water is being back-washed through filter cartridge 30 in the upstream direction), the user can more easily apply force to squeeze clean water through filter cartridge 30 and into first reservoir 20, potentially increasing the efficiency with which filter cartridge 30 is cleaned.

The upper portion of first reservoir 20 optionally includes one or more apertures 26 or a hook, which allows water treatment device 10 to be easily suspended, for example, by a piece of rope tied to a tree branch or other tall structure, to facilitate use of gravity to force unfiltered water 21 through filter cartridge 30.

Rigid member 22 optionally includes one or more apertures which allow rigid member 22 to function as a handle so that water treatment device 10 may be carried by the user. Such an embodiment allows water treatment device 10 to be easily suspended, for example, by a tree branch or other tall structure, to facilitate use of gravity to force unfiltered water 21 through filter cartridge 30.

In some embodiments, the configuration of reservoirs 20 and/or 40 is such as to optimize gravity and/or manual pressure-assisted filtration. In some embodiments, first reservoir 20 is shaped to be taller in height than the width of first reservoir 20. In some embodiments, first reservoir 20 is shaped such that its height is at least double the width of first reservoir 20. This configuration enables a larger pressure head to be produced by the unfiltered water 21 in first reservoir 20, thereby improving the efficiency of gravity-assisted filtration, because the pressure head is proportional to the vertical height of the water. This configuration may also increase the pressure that a user can generate within first reservoir 20 by squeezing, rolling, or folding reservoir 20.

In some embodiments, the configuration of filter cartridge 30 is such as to optimize gravity, assisted filtration. For example, using a longer filter cartridge (i.e., a filter cartridge having a greater height) will similarly increase the height through which the water must flow before it encounters ambient air pressure. The increase in height results in a higher pressure head within water treatment device 10 (i.e., a greater amount of water pressure is generated to drive unfiltered water 21 through filter cartridge 30).

In the use of the illustrated embodiment, unfiltered water may be loaded into the first reservoir 20 through the opening 24. Threaded portions 33 and 35 are unscrewed to separate first reservoir 20 from filter cartridge 30. Unfiltered water 21 is loaded into first reservoir 20 through opening 24. Optionally, a cap or other suitable closure can be secured over opening 24 to store unfiltered water 21 in first reservoir 20 until a user is ready to begin filtering. Optionally, a user can wash or wipe down the exterior surfaces of first reservoir 20, to minimize the risk of pathogens or other contaminants being transferred from first reservoir 20 to filtered water 23 that is removed from second reservoir 40 for use.

The opening 24 of the first reservoir 20 is then coupled to the upstream receiving portion 32 of the filter cartridge 30. In the illustrated embodiment, first reservoir 20 is coupled to filter cartridge 30 by engaging threaded portion 35 of opening 24 with threaded portion 33 of upstream receiving portion 32. Second reservoir 40 is also coupled to filter cartridge 30 by engaging threaded portions 37 and 39, either prior to or after engagement of first reservoir 20 with filter cartridge 30.

Once water treatment device 10 has been filled with unfiltered water 21 and assembled, in a water-filtering mode, unfiltered water 21 is driven through filter cartridge 30 to produce filtered water 23. The force required to cause unfiltered water 21 to pass through filter cartridge 30 in a water-filtering mode can be provided by manual pressure or by gravity. In some cases, manual pressure is used to assist gravity filtration, i.e., manual pressure-assisted filtration.

In a gravity water-filtering mode, unfiltered water 21 is forced through filter cartridge 30 by gravity. In a gravity water-filtering mode, water treatment device 10 can optionally be suspended from a suitable point of support in any suitable manner, e.g., by using a rope to tie water treatment device 10 to a taller structure via aperture 26, by connecting a hook provided on an upper portion of first reservoir 20 to a suitable support, or the like. Water treatment device 10 is permitted to hang from such a point of support. Alternatively, a user can simply hold water treatment device 10 in a suspended fashion. The force of gravity acting against unfiltered water 21 forces unfiltered water 21 through filter cartridge 30, and filtered water 23 flows into second reservoir 40.

In a manual pressure-filtering mode, the user applies pressure to the first reservoir 20 in any suitable manner, for example, by squeezing, clenching, or rolling first reservoir 20 to apply pressure against unfiltered water 21 to force the unfiltered water through filter cartridge 30. In embodiments in which rigid member 22 is present, a user can roll first reservoir 20 around rigid member 22 to apply force against unfiltered water 21.

Treated water may be stored by removing second reservoir 40 from the filter cartridge 30 and optionally closing the opening 44, for example, with a screw cap 48 that includes a threaded interior surface 50 that is dimensioned and configured to sealingly engage with exterior threaded portion 39. The filtered water may alternatively or also be dispensed from second reservoir 40 through the flow controller 46. The flow controller 46 may be any suitable device for regulating the release of fluid, such as a flow valve, a spigot, a spout, a hose and clamp, or the like.

In some embodiments, the flow controller 46 may be located on the lower side of the second reservoir 40. In another embodiment, the flow controller 46 may be located on the bottom edge or end of the second reservoir 40. In cases where the rigid member 42 is present, the flow controller 46 may be incorporated into the rigid member 42. Embodiments in which the flow controller 46 is located along the side edge of reservoir 40 (as opposed to embodiments in which the flow controller 46 is located on the bottom edge or end of reservoir 40) allow the rigid member 42 to be used for rolling to increase pressure in reservoir 40 without interference from flow controller 46.

In some embodiments, filter cartridge 30 is configured so that its length is equal to the width of reservoirs 20 and 40, so that reservoirs 20 and 40 may be rolled up around filter cartridge 30 for convenient storage.

Figure 2:
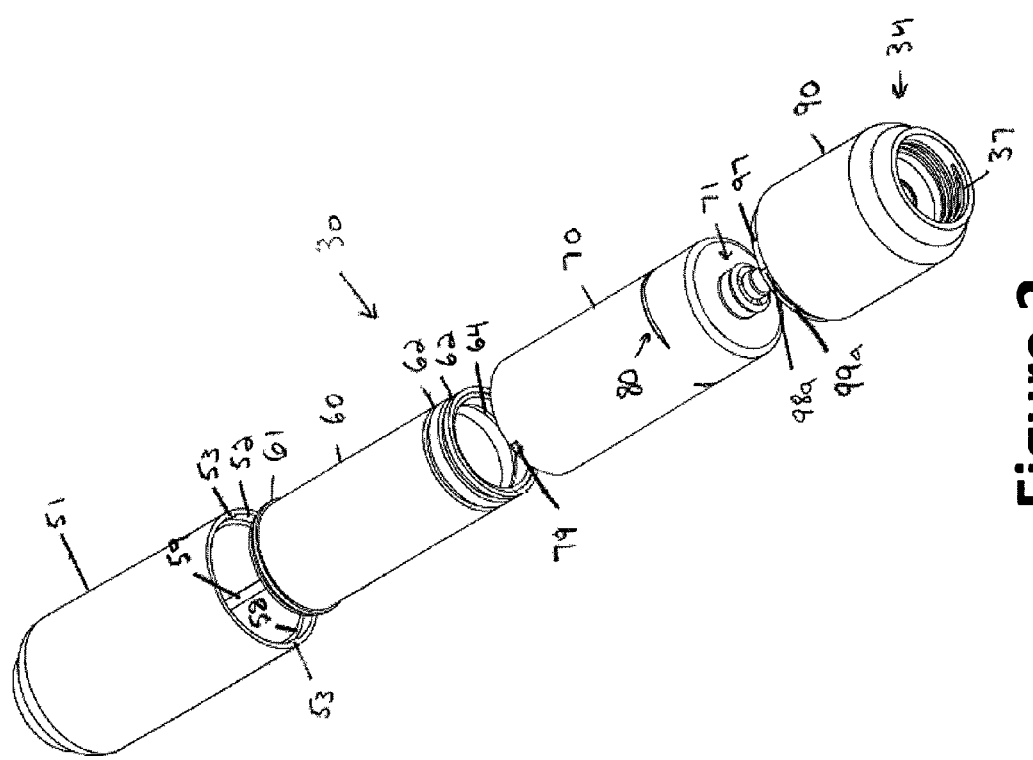
FIG. 2 shows an exploded view of a first embodiment of a water filter of the water filtration device.

Referring to FIG. 2, a first embodiment of a filter cartridge 30 is shown. The filter cartridge 30 comprises an upstream housing 51, a membrane cartridge 60, a plunger 70 and a downstream housing 90. The upstream housing 51 comprises the upstream receiving portion 32, an upstream housing recess 52, an upstream tab 53, a plunger slot 59 and a plunger stop 58. The membrane cartridge 60 comprises a cartridge lip 61, an outer O-ring recess 62 and an inner O-ring recess 64. The plunger 70 comprises a plunger tab 79, a sealable port 71 and a shaped slot 80. The downstream housing 90 comprises a downstream housing recess 97, a bayonet slide 99a, a bayonet slot 98a, the downstream receiving portion 34 and the downstream threaded portion 37.

The upstream housing 51, membrane cartridge 60, plunger 70 and downstream housing 90 may be constructed from a substantially rigid non-porous plastic material. Examples of potentially suitable plastics that could be used include polypropylene (PP), various copolymers, polycarbonate (PC), acrylonitrile butadiene styrene (ABS), a polycarbonate/acrylonitrile butadiene styrene blend (PC/ABS), high-density polyethylene (HDPE), low-density polyethylene (LDPE), polyester, and copolyester.

Figure 3B:
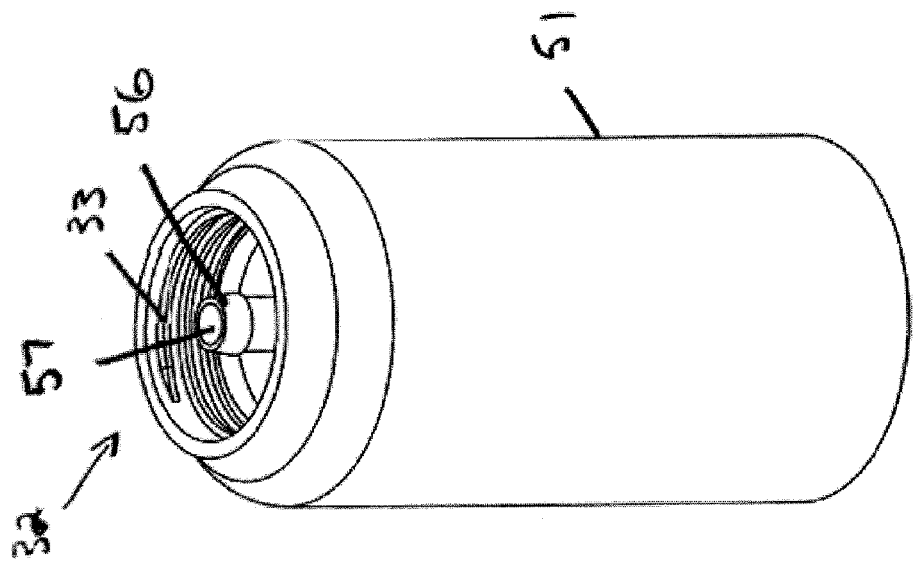
FIG. 3B shows a perspective view of the upstream housing of the first water filter.
Figure 3A:
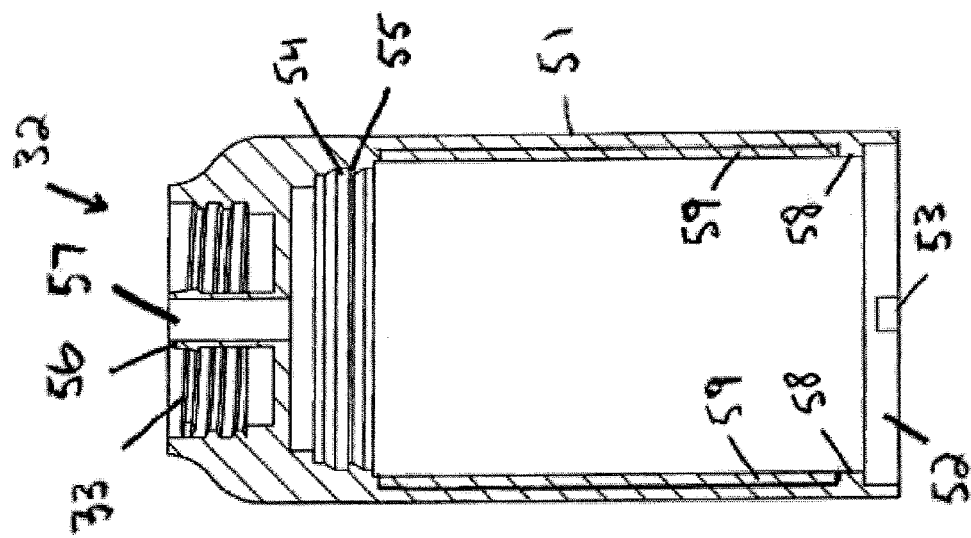
FIG. 3A shows a side cross-sectional view of an upstream housing of the first water filter.
Figure 7:
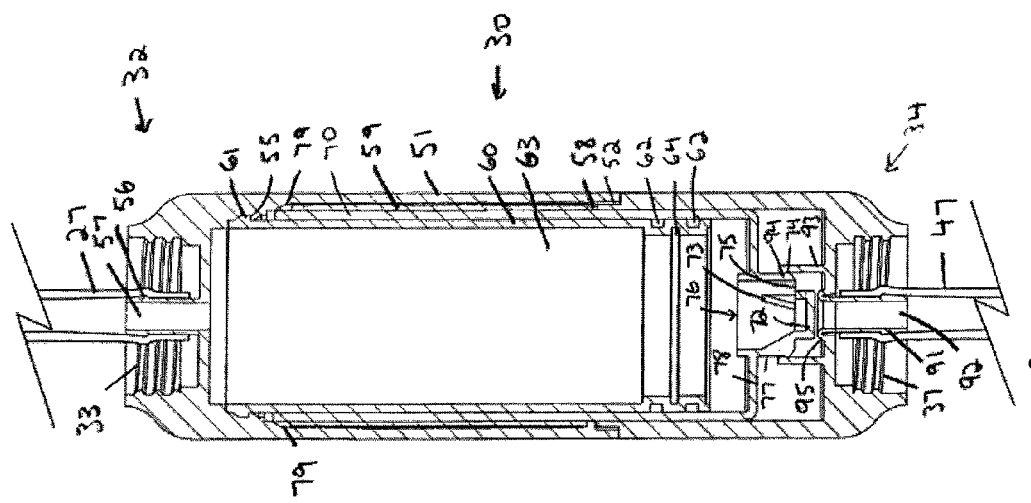
FIG. 7 shows a side cross-sectional view of the assembled first water filter, along with hoses for indirectly connecting the filter to the first and second reservoirs.

Referring to FIG. 3A and FIG. 3B, the upstream receiving portion 32 of the upstream housing 51 is for receiving an incoming flow of water to be treated and comprises the upstream threaded portion 33, as previously described. A suitable fitting, such as an upstream hose fitting 56, may optionally be provided for connection of the upstream reservoir 20 via a flexible fluid conduit (e.g., an upstream hose 27, as illustrated in FIG. 7) as an alternative to the use of the upstream threaded portion 33. In some embodiments, it may be beneficial for the hose 27 to be transparent, to facilitate a visual comparison of the water entering the device and the water exiting the device, thus providing the user with added confidence regarding the treatment process.

Regardless of whether or not the upstream hose fitting 56 is present, an upstream fluid opening 57 is provided within the upstream receiving portion 32 to permit ingress of water to be treated.

Turning specifically to FIG. 3A, the interior of the upstream housing 51 comprises a cartridge recess 54 that is bounded at its lower end by a cartridge retainer 55. The cartridge recess 54 and cartridge retainer 55 are annular and complementary in shape to the cartridge lip 61 of membrane cartridge 60. Referring additionally to FIG. 7, upon assembly, the membrane cartridge 60 is inserted within the upstream housing 51 until an upper edge of the cartridge lip 61 engages a lower edge of the cartridge retainer 55. Further insertion of the membrane cartridge 60 into the upstream housing 51 causes deformation of the cartridge lip 61 until it passes the cartridge retainer 55 and returns to its original shape. This ensures a semi-permanent snap-fit between the upstream housing 51 and the membrane cartridge 60.

The interior of the upstream housing 51 further comprises a plunger slot 59 with an upstream end terminating below the cartridge retainer 55 and a downstream end that is bounded by a plunger stop 58. The plunger slot 59 is complementary in shape to plunger tab 79. At least a pair of plunger slots 59 and a pair of plunger tabs 79 are provided. Returning again to FIG. 7, upon insertion of the plunger 70 within the upstream housing 51, following the aforementioned snap-fit of the membrane cartridge 60 therewithin, the plunger tabs 79 are aligned with the plunger slots 59 and engage the plunger stop 58. Further insertion of the plunger lower end 78 within the upstream housing 51 causes deformation of the plunger tabs 79 until they pass the plunger stop 58 and return to their original shape. This ensures a semi-permanent snap-fit between the upstream housing 51 and the plunger 70 that substantially prevents removal of the plunger. Thereafter, the plunger 70 is permitted to slide axially relative to the upstream housing 51 by movement of the plunger tabs 79 along the plunger slots 59. However, the plunger 70 is prevented from rotating relative to the upstream housing 51.

Figure 4B:
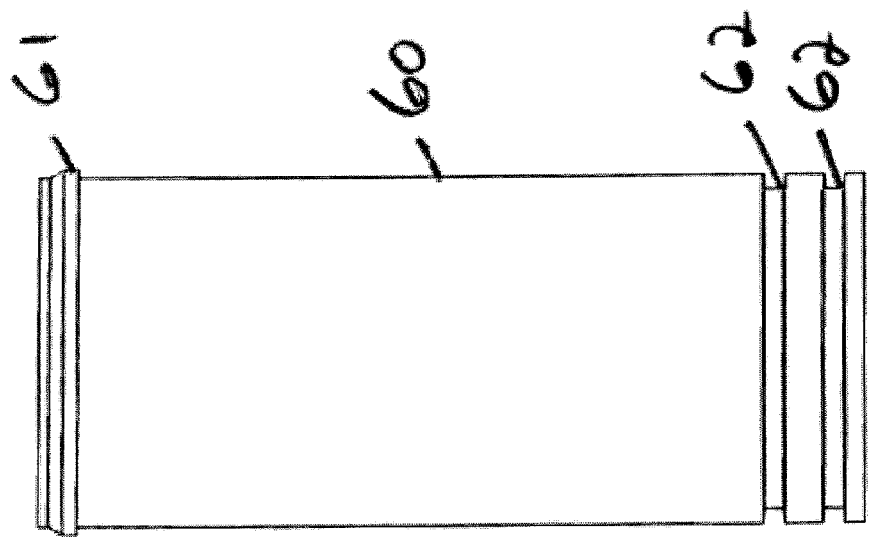
FIG. 4B shows a side view of the membrane cartridge of the first water filter.
Figure 4A:
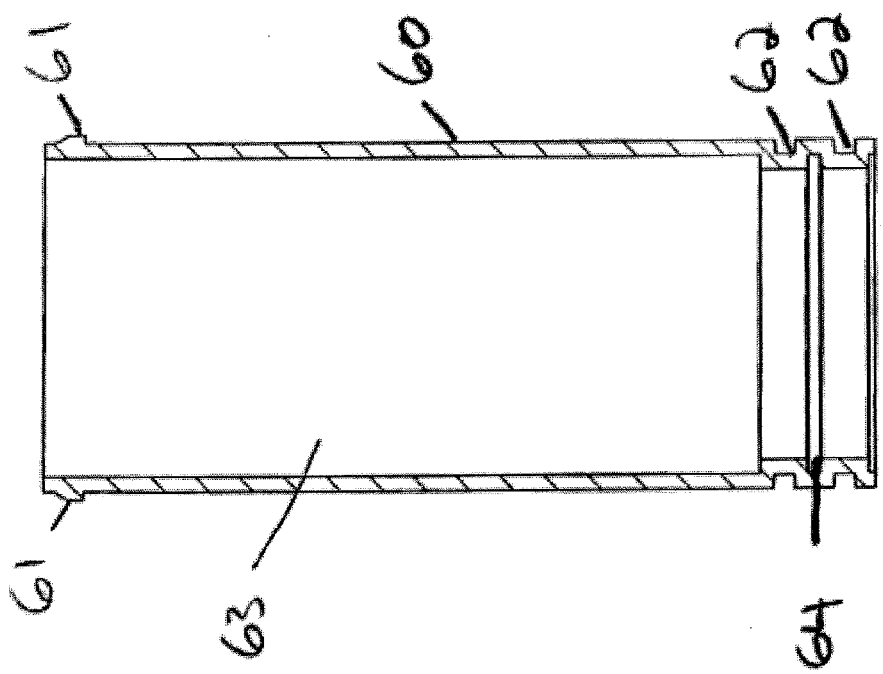
FIG. 4A shows a side cross-sectional view of a membrane cartridge of the first water filter.

Once the membrane cartridge 60 has been snap-fit within the upstream housing 51 and the plunger 70 has been inserted over the membrane cartridge 60 to slidingly snap-fit within the upstream housing 51, sealing engagement between the membrane cartridge 60 and the interior of the plunger 70 is provided by a pair of O-rings within the outer O-ring recesses 62. This prevents contaminated water entering the upstream housing 51 via the upstream fluid opening 57 from bypassing the membrane cartridge 60 and instead forces it to flow through the membrane receiving portion 63 (FIG. 4A) of the membrane cartridge 60, as will be more completely described hereinafter. Similarly, the inner O-ring recess 64 accommodates an O-ring for sealing against a membrane 112 (FIG. 9A) to prevent contaminated water from passing between the membrane 112 and the membrane receiving portion 63. The downstream housing 90 may then be installed over the plunger 70.

Figure 6B:
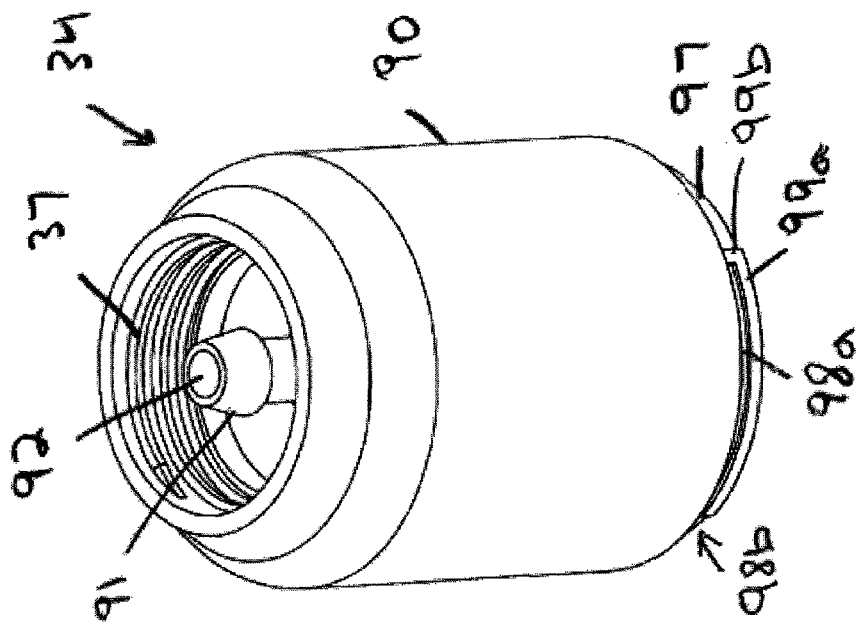
FIG. 6B shows a perspective view of the downstream housing of the first water filter in an inverted orientation relative to FIG. 6A.
Figure 6A:
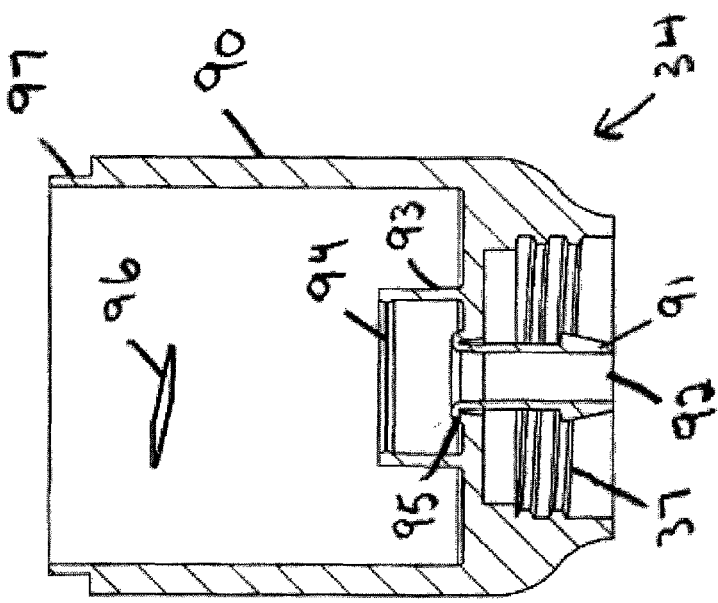
FIG. 6A shows a side cross-sectional view of the downstream housing of the first water filter.

Referring to FIG. 6A and FIG. 6B, the downstream housing 90 comprises a downstream housing recess 97 upon which is provided a bayonet slide 99a. The bayonet slide 99a protrudes radially from an outer annular surface of the downstream housing recess 97 by an amount slightly less than the depth of the recess. Therefore, the bayonet slide 99a does not protrude past the outer diameter of the downstream housing 90. A bayonet slot 98a is formed between the bayonet slide 99a, the outer annular surface of the downstream housing recess 97 and a lower edge of the downstream housing 90. Since the bayonet slide 99a is substantially L-shaped, the bayonet slot 98a has a bayonet open end 98b and a bayonet closed end 99b.

Upon insertion of the downstream housing recess 97 within the upstream housing recess 52, the downstream housing 90 is oriented such that the upstream tab 53 is aligned with the bayonet open end 98b. Thus, upon rotation of the downstream housing 90 relative to the upstream housing 51 about a central axis of the filter cartridge 30, the upstream tab 53 enters the bayonet open end 98b and engages within the bayonet slot 98a. Thereafter, the downstream housing 90 is prevented from being axially withdrawn from the upstream housing 51 by interference between the upstream tab 53 and the bayonet slide 99a, while being permitted to rotate further only to the extent permitted by engagement of the upstream tab 53 with the bayonet closed end 99b.

Referring specifically to FIG. 6B, a tab 96 protrudes radially inwardly from within an interior of the downstream housing 90. The tab 96 has a pair of parallel spaced apart faces normal to the central axis of the filter cartridge 30, but rotated about that axis relative to one another, connected to one another at each end by a slanted face.

Turning to FIG. 5B, the tab 96 engages within a shaped slot 80 formed in an exterior of the plunger 70. When the downstream housing 90 is initially positioned over the plunger 70, it is oriented such that the upstream tabs 53 are just outside the bayonet open end 98b. The shaped slot 80 is positioned axially and circumferentially on the plunger 70 such that the tab 96 engages a third engagement portion 85 of the shaped slot 80 when the plunger 70 is initially inserted. Since the plunger 70 is prevented from rotating relative to the upstream housing 51 by engagement of the plunger tabs 79 within the plunger slots 59, further rotation of the downstream housing 90 causes the tab 96 to move along the shaped slot in a manner as will be described hereinafter.

Rotation of the downstream housing 90 causes the tab 96 to move from the third engagement portion 85 to the second engagement portion 84. The shaped slot 80 is positioned axially and circumferentially on the plunger 70 such that the upstream tab 53 enters the bayonet open end 98b and just begins to be rotatably engaged within the bayonet slot 98a when the tab 96 is in the second engagement position. Thus, the upstream tab 53 prevents the downstream housing 90 from moving axially relative to the upstream housing 51 by virtue of being constrained within the bayonet slot 98a. The downstream housing 90 is only permitted to rotate about the central axis of the filter cartridge 30 between the positions where the upstream tab 53 engages the bayonet closed end 99b and where the tab 96 engages the third engagement portion 85. This corresponds to a total rotation of just less than one half of the circumference of the filter cartridge 30, in this embodiment.

Further rotation of the downstream housing 90 causes the tab 96 to move from the second engagement portion 84 to the first engagement portion 82. In this position, the filter cartridge 30 is in a first flow configuration, as will be further described hereinafter.

Referring additionally to FIG. 5A, the plunger lower end 78 is equipped with a sealable port 71, comprising a port wall 77 that protrudes from the plunger lower end 78 and is equipped at its lower end with an outwardly radially extending port lip 74. A plurality of port ribs 73 are provided on an interior of the port wall 77 and protrude radially inwardly to suspend a closed port end 72 from their lower edges. The space between the port ribs 73 is open, allowing a port aperture 75 to be formed between the port end 72 and the port wall 77. Treated water exiting the membrane 112 (FIG. 9A) into a treated water chamber 82 (FIG. 9A) formed between a lower end of the membrane housing 60 and the plunger lower end 78 enters the sealable port 71 through port opening 76 and passes between the port ribs 73 to exit the plunger 70 through the port apertures 75.

Returning to FIG. 6A and FIG. 7, the sealable port 71 is situated within a port receiving portion 93 of the downstream housing 90 when the downstream housing 90 is assembled with the upstream housing 51, as previously described. The shaped slot 80 is positioned axially on the plunger 70 such that, when the tab 96 is engaged within the first engagement portion 81 of the shaped slot 80, the radially outwardly extending port lip 74 is within the port receiving portion 93 and sealingly engaged with a radially inwardly extending sealing lip 94. The port wall 77 protrudes by a distance such that the port end 72 is spaced apart from a port seal 95 formed in the port receiving portion 93. This permits treated water passing through the port aperture 75 to exit through the downstream flow opening 92. The downstream flow opening 92 may be provided within an optional fitting, such as downstream hose fitting 91, as shown, or may simply allow treated water to exit the downstream housing 90 through the downstream receiving portion 34. This is referred to as a first flow configuration of the water filter cartridge 30.

Returning briefly to FIG. 7, it should be noted that the downstream hose fitting 91, when provided, may be used to connect the downstream reservoir 40 via downstream reservoir hoses 47, as an alternative to threaded connections via the downstream threaded portion 37.

Figure 9A:
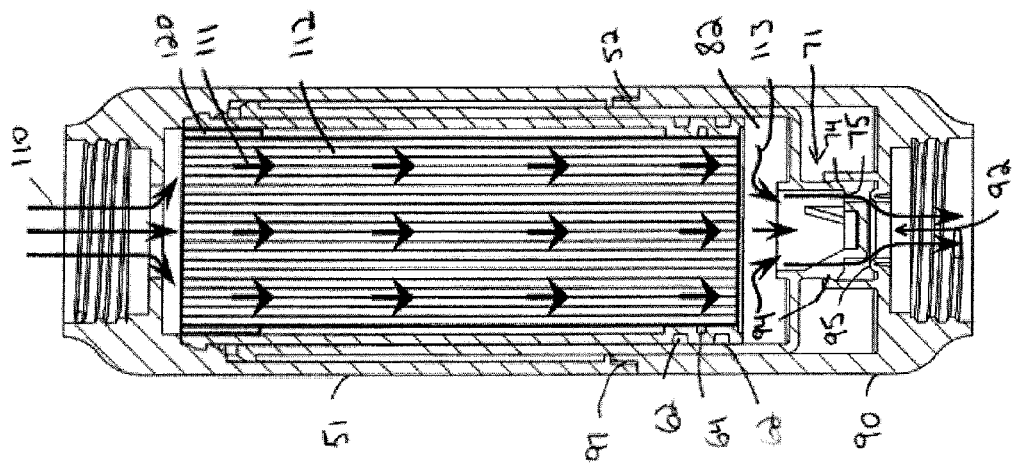
FIG. 9A shows a side cross-sectional view of the first water filter illustrating a first flow configuration of the water filter.
Figure 9B:
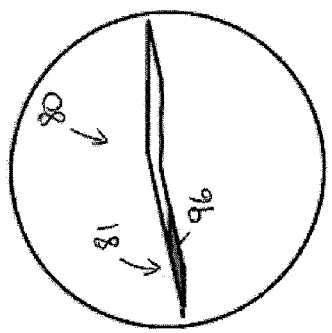
FIG. 9B illustrates a first engagement position of the tab in the shaped slot of the plunger when the filter is in the first flow configuration.

The first flow configuration of the filter cartridge 30 is further illustrated with reference to FIG. 9A and FIG. 9B. Referring to FIG. 9B, the tab 96 is situated at a first engagement portion 81 of the shaped slot 80. An incoming flow 110 passes into the upstream housing 51 as previously described and is forced to enter the membrane 112. A membrane spacer 120 is illustrated at an upstream end of the membrane 112 to center the membrane within the filter. A filtration flow 111 passes through the membrane and is treated once it exits the membrane 112 into treated water chamber 82. Thereafter, a treated flow 113 exits the treated water chamber 82 via the sealable port 71 passing outwardly therefrom through port apertures 75. The treated flow 113 then passes between the port end 72 and port seal 95 to exit the filter cartridge 30 through downstream flow opening 92. The first flow configuration may therefore be referred to as the "open" position.

The treated flow 113 is prevented from leaking out of the downstream housing 90 by sealing engagement of the port lip 74 with the sealing lip 94. Similarly, the incoming flow 110 is prevented from leaking past the membrane 112 by an O-ring disposed within the inner O-ring recess 64. In addition, leakage past the membrane cartridge 60 is prevented by virtue of O-rings located within outer O-ring recesses 62. A seal may also be provided to prevent leakage between the plunger 70 and the upstream housing 51 at least when the filter cartridge 30 is in the first flow configuration. It is worthwhile noting that, while in the first flow configuration, the downstream housing recess 97 substantially overlaps with the upstream housing recess 52 so that the downstream housing 90 abuts the upstream housing 51.

Figure 10A:
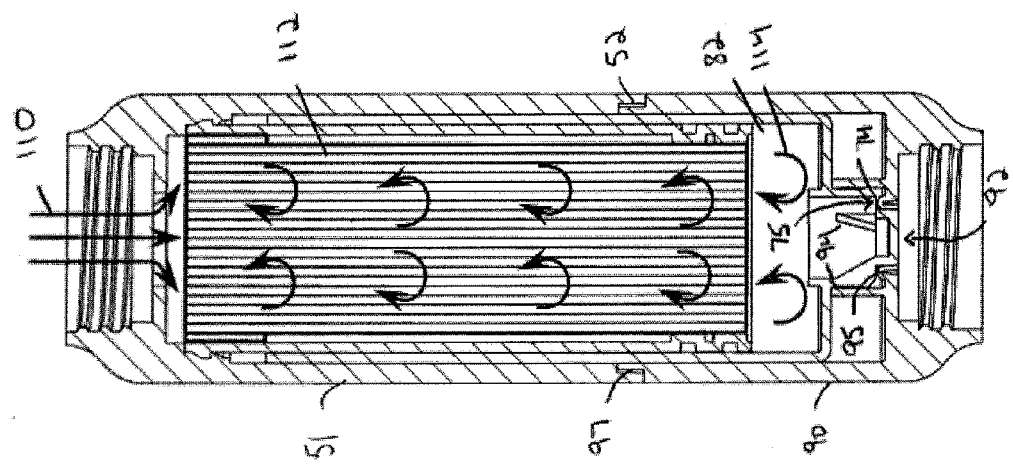
FIG. 10A shows a side cross-sectional view of the first water filter illustrating a second flow configuration of the water filter.
Figure 10B:
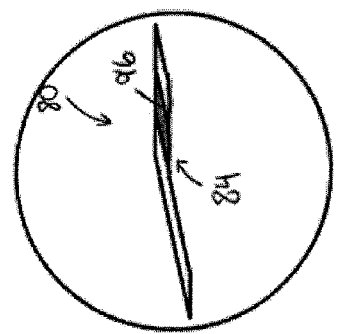
FIG. 10B illustrates a second engagement position of the tab in the shaped slot of the plunger when the filter is in the second flow configuration.

A second flow configuration of the filter cartridge 30 is illustrated with reference to FIG. 10A and FIG. 10B. Referring to FIG. 10B, the tab 96 moves from the first engagement portion 81 (illustrated in FIG. 9B) to the second engagement portion 84 by rotation of the downstream housing 90. The downstream housing 90 is rotated in an unlocking direction 100 (FIG. 8A), which is a counterclockwise direction in this embodiment when viewed from the downstream end. Since the downstream housing 90 is prevented from moving axially relative to the upstream housing 51 by engagement of the upstream tabs 53 within the bayonet slot 98a, movement of the tab 96 along the slot 80 causes the plunger 70 to move axially relative to the downstream housing 90. Axial movement of the plunger 70 relative to the upstream housing 51 is permitted by virtue of the plunger tabs 79 moving along the plunger slots 59. The amount of axial movement provided is defined by the length of the first engagement portion 81. This length is selected such that movement of the tab 96 to the second engagement portion 84 causes the port end 72 to move into the downstream flow opening 92. This in turn causes the port seal 95 to deform and seal the port aperture 75, thus preventing a flow of treated water from exiting the filter cartridge 30. Therefore, when the tab 96 is within the second engagement portion 84, the filter cartridge 30 is in a second flow configuration wherein the flow of treated water from the filter cartridge 30 is prevented. The second flow configuration may be referred to as the "closed" position.

Referring to FIG. 8A, FIG. 8B and FIG. 8C, a sequence of operations performed in the back-washing of the filter cartridge 30 is illustrated. Back-washing may be performed as frequently or as infrequently as desired by users of the filter cartridge 30, based upon the cleanliness of the water being treated and the acceptable rate of flow through the filter cartridge 30. In FIG. 8A, the filter cartridge 30 is shown in the first flow configuration with the downstream housing 90 abutting the upstream housing 51. Rotation of the downstream housing 90 about the central axis of the filter cartridge 30 in an unlocking direction 100 (counterclockwise when viewed from the downstream end), causes the upstream tabs 53 to disengage from the bayonet open end 98b when the tab 96 is in the third engagement position 85, as illustrated in FIG. 11 b. This allows the downstream housing 92 to move axially relative to the upstream housing 51 in the extension direction 101, as illustrated in FIG. 8B.

Referring to FIG. 11A, axial movement of the downstream housing 90 in the extension direction 101 causes the plunger 72 to also move axially relative to the housing 51, by virtue of the interaction between the tab 96 and the third engagement portion 85 of the slot 80. This axial movement is permitted by translation of the plunger tabs 79 along the plunger slots 59 and causes enlargement of the treated water chamber 82. This causes a negative pressure to form, drawing incoming flow 110 through the membrane 112 to create the treated flow 113. The treated flow 113 accumulates, as indicated by the level of treated water 83 within the treated water chamber 82. The treated water 83 is prevented from exiting through the aperture 75 by the port seal 95, which remains engaged with the aperture 75 as previously described with reference to the second flow configuration. Thus, FIG. 11A illustrates a third flow configuration of the filter cartridge 30. The third flow configuration may be referred to as the "pre-back-wash" position.

Figure 12A:
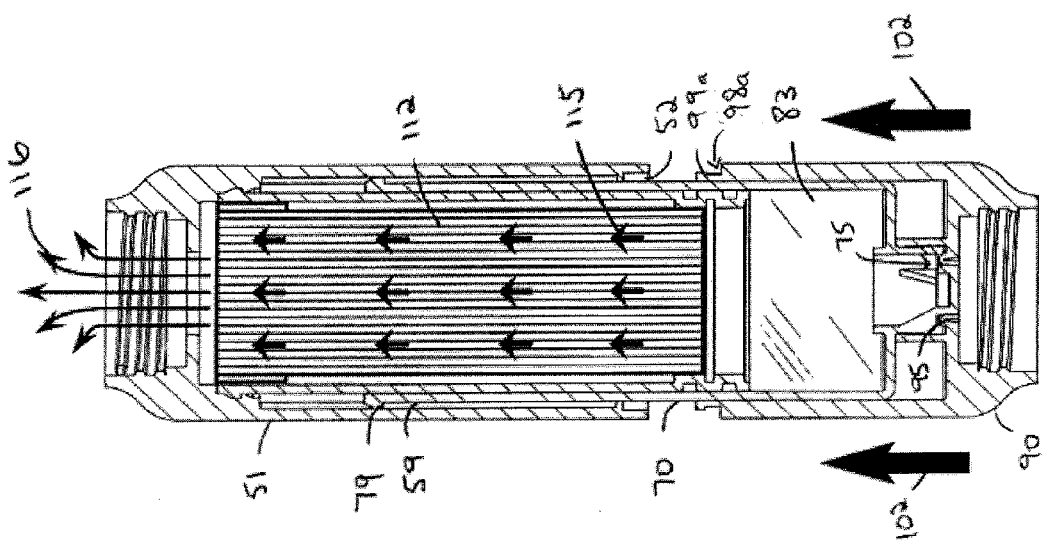
FIG. 12A shows a side cross-sectional view of the first water filter illustrating a fourth flow configuration of the water filter.

Returning to FIG. 8C, back-washing is conducted by moving the downstream housing 90 in the plunging direction 102. Referring to FIG. 12A, movement of the downstream housing 90 in the plunging direction 102 causes a decrease in volume of the treated water chamber 82 and pressurizes treated water 83. This pressure forces a back-wash flow 115 to move through the membrane 112 in a direction opposite to the normal filtration direction and dislodges accumulated debris therefrom. The debris contaminated water is expelled from the upstream housing 51 as indicated by contaminated flow 116. The contaminated flow 116 may be returned to the upstream reservoir 20; alternatively, the upstream reservoir 20 may be removed prior to back-washing and a separate contaminated water reservoir (not shown) may be provided. Thus, FIG. 12A illustrates a fourth flow configuration of the filter cartridge 30. The fourth flow configuration may be referred to as the "back-wash" position. While four flow configurations are described, it is contemplated that fewer, or additional, flow configurations may be incorporated with the filter cartridge 30. For instance, the "closed" position may be omitted, if desired, since the flow valve is also closed during the back-wash position.

Although it is often sufficient to perform a single back-wash cycle in order to restore an acceptable flow rate through the filter cartridge 30, any number of successive pre-back-wash and back-wash cycles may be performed.

Figure 12B:
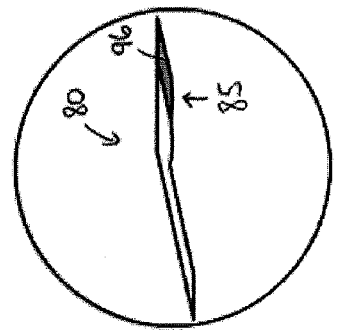
FIG. 12B illustrates a third engagement position of the tab in the shaped slot of the plunger when the first water filter is in the fourth flow configuration.

Referring to FIG. 12B, since the tab 96 remains engaged in the third engagement portion 85 of the slot 80, the upstream tab 53 is positioned outside the bayonet open end 98B. When the downstream housing 90 is reinserted within the upstream housing 51, rotation of the downstream housing 90 (in a clockwise direction when viewed from the downstream end) such that the tab 96 moves to the second engagement portion 84 (illustrated in FIG. 10b) causes the upstream tab 53 to re-engage the bayonet slot 98a. This prevents axial withdrawal of the downstream housing 90 from the upstream housing 51. Further rotation of the downstream housing 90 such that the tab 96 reaches the first engagement portion 81 (illustrated in FIG. 9A) restores the filter cartridge 30 to the first flow configuration and allows it to be used to purify water once again.

The pumping action of filter cartridge 30 during the back-wash operation can serve three purposes: (1) back-wash the membrane; (2) start the siphon; and (3) clear out any bubbles that cause an airlock condition.

First, the pumping action allows the user to clean the filter cartridge 130 through back-washing techniques. Specifically, as discussed above with respect to the first water filter cartridge 30, when the top section is pulled up, a negative pressure is created inside the cylinder, causing water to be drawn in from upstream, through the filter membrane and into the cavity 191 in the cylinder 190. When the top section is pushed down, that same water is expelled back the way it came, which flushes away any debris that may be trapped in the membrane. This process, called back-washing, keeps the filter from gradually becoming clogged. The back-wash water exits through the top of the filter, where it can be discarded.

Second, when the filter is configured to receive water by siphoning the water from an upstream container through a hose, the pumping action also offers an additional feature of priming the filter cartridge and hose 130 (i.e., starting the siphon). A siphon is created when a tube is positioned in an inverted U shape, and liquid is caused to flow uphill, above the surface of the upstream reservoir, without pumps, powered by the fall of the liquid as it flows down the tube under the pull of gravity, and is discharged at a level lower than the surface of the upstream reservoir it came from. For example, when the upstream end of the filter cartridge 130 is attached to a water source, the user may unlock and back-wash the filter assembly, thereby drawing water into the membrane bundle 187 and expelling any air in the filter cartridge 130 and membrane bundle 187.

Furthermore, to optimize the effectiveness of the priming operation, it may be advantageous to configure the stroke volume of the pumping motion (i.e., the change in internal volume when you pump the plunger up and down) to be greater than the internal volume of the upstream hose. That is, if the hose volume is greater than or equal to the stroke volume, pumping the filter cartridge 130 will simply pull in air from the hose and expel that same air back to the hose. However, if the hose volume is less than the stroke volume, each upstroke will first draw in the air from the hose and then draw in some of the water from the upstream container, and each downstroke will expel the air first and then some of the water. Accordingly, when a smaller hose volume is used, the filter and hose will fill with water as the user pumps, instead of simply pumping the same air back and forth, to and from the hose. For example, when the stroke volume is 40 mL and the internal volume of the hose is 22 mL, each stroke of the pump will add 18 mL of water to the filter/hose assembly.

Third, the pumping action allows the clearing out of any air bubbles that could otherwise create an airlock condition, which can reduce flow rate and/or prevent flow completely. Indeed, an airlock condition is a relatively common problem among water filters and typically occurs when there is surface tension at the air-water interface that can resist the flow of water, effectively blocking the filter. Airlock is particularly problematic for intermittently-used filters because they are frequently filled and emptied of water, providing many opportunities for air to be trapped in the wrong place. Fortunately, the above-described pumping action clears out any bubbles in the filter cartridge 130 and/or membrane bundle 187, thereby alleviating the airlock problem.

Regarding embodiments that make use of a hollow-fiber membrane filter, it is common in the industry to use a hydrophilic (water-attracting) membrane material, because the more hydrophilic the material is, the less pressure it takes to drive water through the membrane. However, to improve effectiveness of the priming feature and the airlock-clearing feature, it may be advantageous to include a minority of hydrophobic (water-repelling) fibers in the membrane bundle. Hydrophobic fibers create a low-resistance path for air to pass through the membrane bundle. Thus, by including some hydrophobic fibers, both air and water are able to pass forward and backward through the membrane. In some embodiments it may be preferable for 5-15% of the fibers to be hydrophobic fibers. More specifically, it may be preferable for 10% of the fibers to be hydrophobic fibers. This may facilitate the expulsion of air from the filter, making it easier to start the siphon and clear away air bubbles causing airlock.

It should be noted that, although the membrane 112 is described illustratively in this embodiment, other types of back-washable filtration media may be used without departing from the function of the filter as described in connection with this embodiment.

Figure 13:
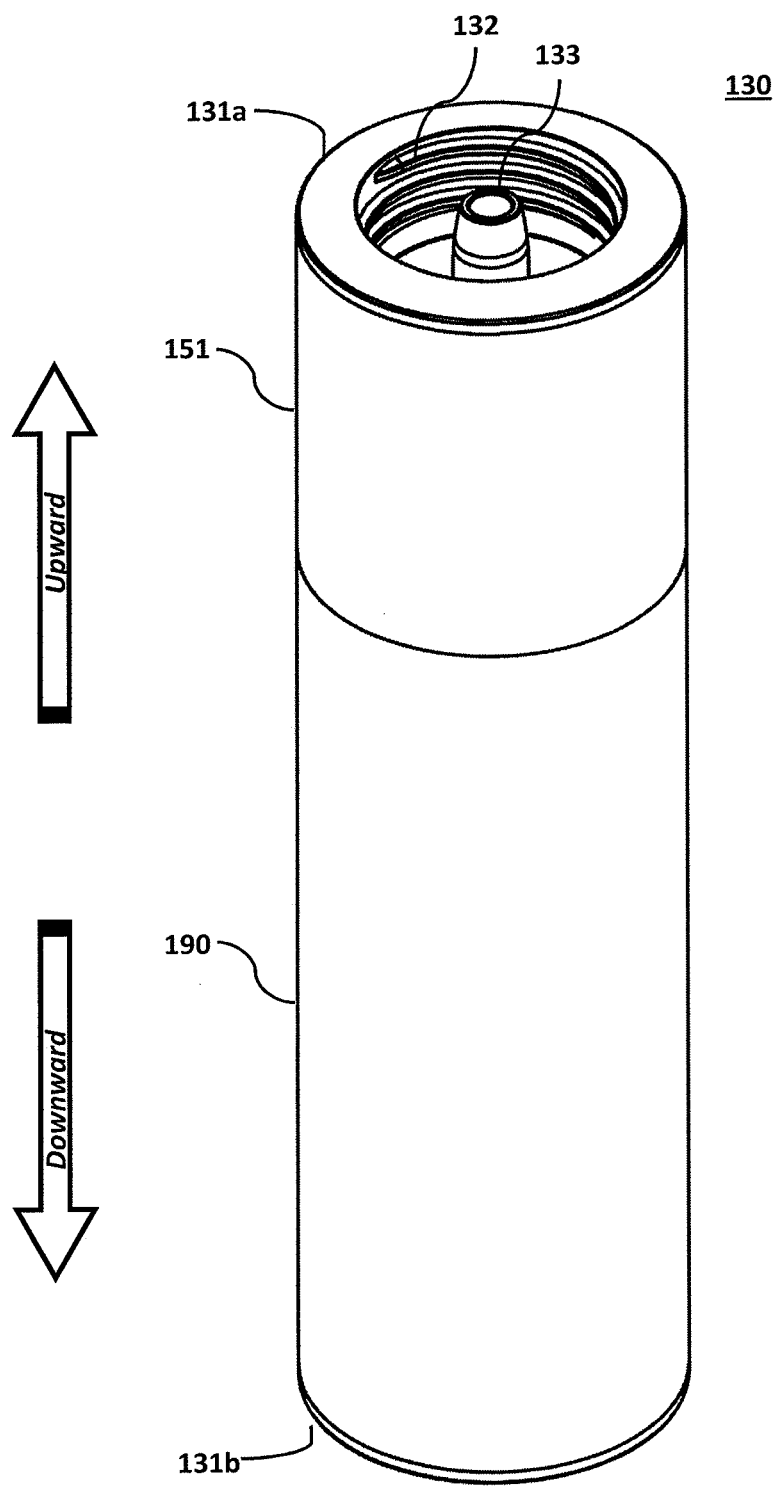
FIG. 13 illustrates a perspective view of a second embodiment of a water filter of the water filtration device in an open position.

Turning now to FIG. 13, a second embodiment of a water filter cartridge 130 is shown. As will be discussed in greater detail below, the filter cartridge 130 generally comprises an upstream housing 151, a downstream housing 190, end caps 131a, 131b, membrane cartridge 160, valve cap 171, and a water treatment material, such as a hollow-fiber membrane filter bundle 187. Like the filter cartridge 30 of the first embodiment, the filter cartridge 130 may be cylindrical in shape and equipped with threaded 132 and/or hose 133 fittings. Similarly, the upstream housing 151, downstream housing 190, end caps 131a, 131b, membrane cartridge 160, and valve cap 171 may also be constructed from a substantially rigid non-porous plastic material. Examples of potentially suitable plastics that could be used include polypropylene (PP), various copolymers, polycarbonate (PC), acrylonitrile butadiene styrene (ABS), a polycarbonate/acrylonitrile butadiene styrene blend (PC/ABS), high-density polyethylene (HDPE), low-density polyethylene (LDPE), polyester, and copolyester. Because the basic functionality of the filter cartridge 130 of the second embodiment is similar to the filter cartridge 30 of the first embodiment, for brevity, common elements and features will not be discussed at length because they may obscure the invention with unnecessary detail.

Figure 14B:
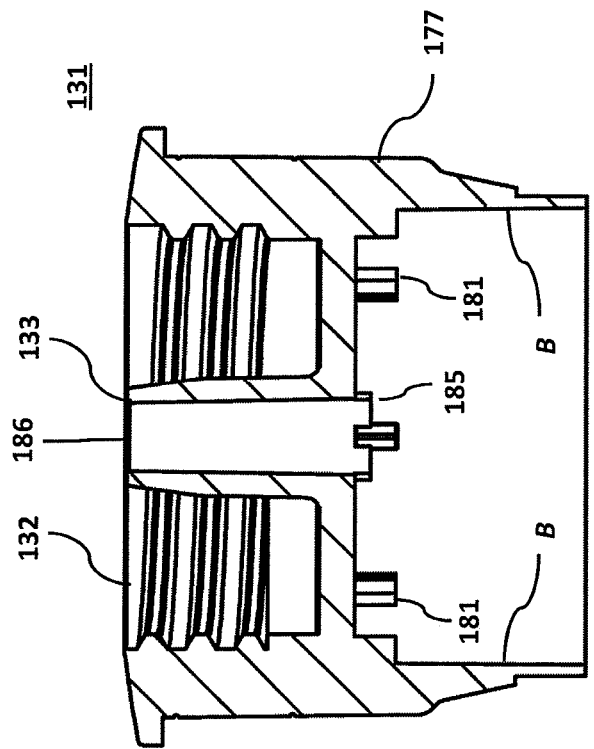
FIG. 14B illustrates a cross-sectional view of the end cap of the second water filter.
Figure 14A:
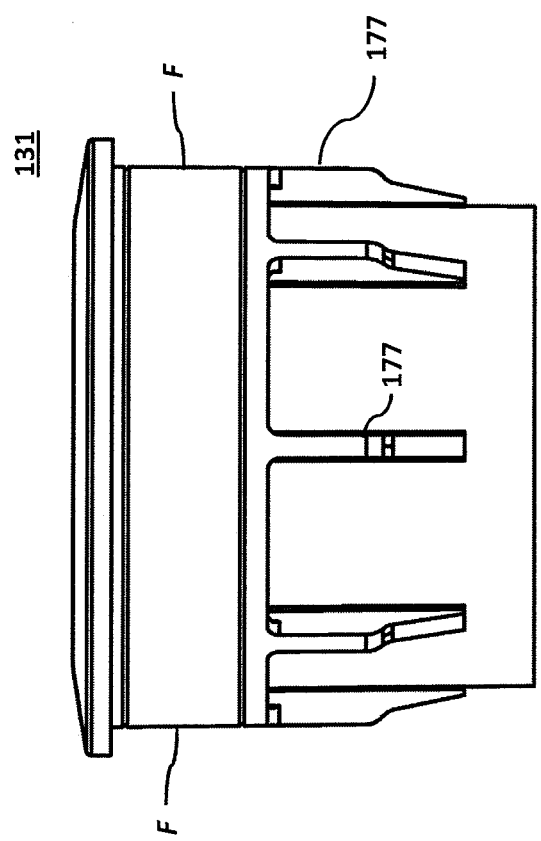
FIG. 14A illustrates a side view of an end cap of the second water filter.
Figure 14D:
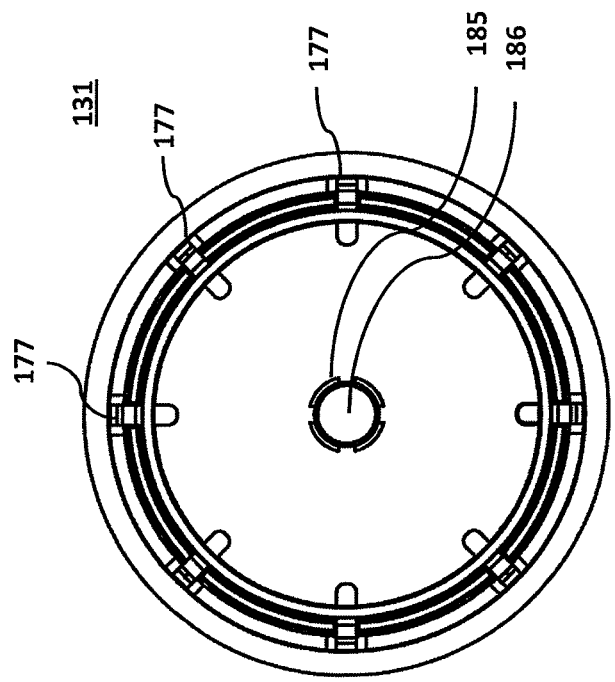
FIG. 14D illustrates a bottom plan view of the end cap of the second water filter.
Figure 14C:
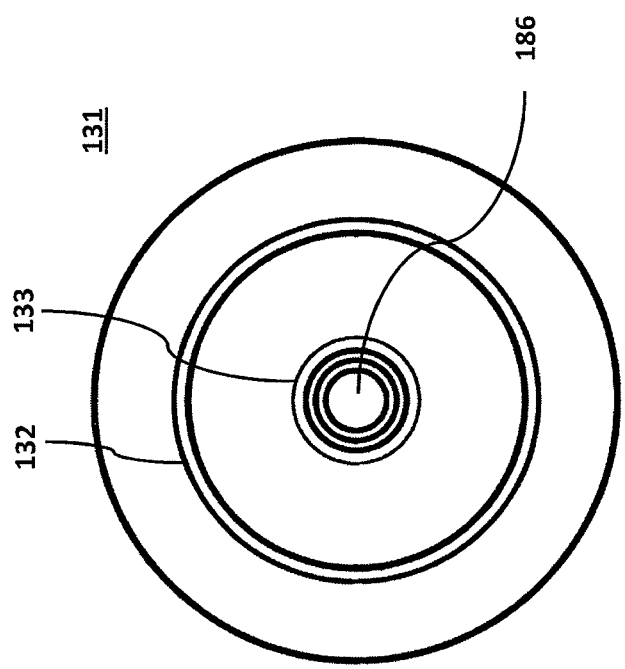
FIG. 14C illustrates a top plan view of an end cap of the second water filter.

FIGS. 14A through 14D illustrate four views of the end cap 131, which may be fused, or otherwise adhered, at each end of the filter cartridge 130. Specifically, FIG. 14A illustrates a side view of an end cap of the second water filter, FIG. 14B illustrates a cross-sectional view of the end cap of the second water filter, FIG. 14C illustrates a top plan view of an end cap of the second water filter, and FIG. 14D illustrates a bottom plan view of the end cap of the second water filter. The end cap 131 is generally circular and sized to substantially conform to an end of the filter cartridge 130.

The threaded 132 and/or hose 133 fittings may be integrated with, or otherwise attached to, each end cap 131 and configured to mate with, for example, standard bottle threads (e.g., SP-410) or flexible tubing. The hose fitting 133 may be configured to couple with flexible tubing having, for example, an internal diameter between 1/8" and 1", or more preferably, between 1/8" and 1/2", or most preferably, between 3/16" and 1/4". However, it is anticipated that the diameter may be adjusted to meet a particular need. Such fittings allow the filter cartridge 130 to be used with a variety of containers, including pop bottles, "soft bottle" bags (a rugged bag that has a threaded opening like a bottle), buckets, jerry cans, etc.

At the center of each end cap 131 is an opening 186 through which the fluid may pass. The opening 186 may be configured such that the fluid is directed through the center of the threaded 132 and/or hose 133 fittings so that the fluid may be ultimately directed to, or from, a container or hose. As illustrated, the end cap 131 may comprise a plurality of ribs 177 along its outer circumference and one or more standoff protrusions 181 on the inner surface. The plurality of ribs 177 may be used to secure a second component, such as the valve cap 171 or membrane cartridge 160, while the stated standoff protrusions 181 maintain a gap between the end cap 131 and the second component, thereby reducing risk of fluid blockage. Further, as illustrated in FIGS. 29-29, one or more anti-seal notches may be incorporated into the end cap 131 to prevent the downstream vessel (i.e., a flange) from sealing to the end cap surface and allow air to escape through the threads, thus avoiding pressurizing the downstream vessel. Finally, one or more radial protrusions 185 may be provided around the opening 186 on the inner surface of the end cap 131. As will be discussed below, the one or more radial protrusions 185 may be used to secure a third component, such as, for example, a spring 183.

Figure 15C:
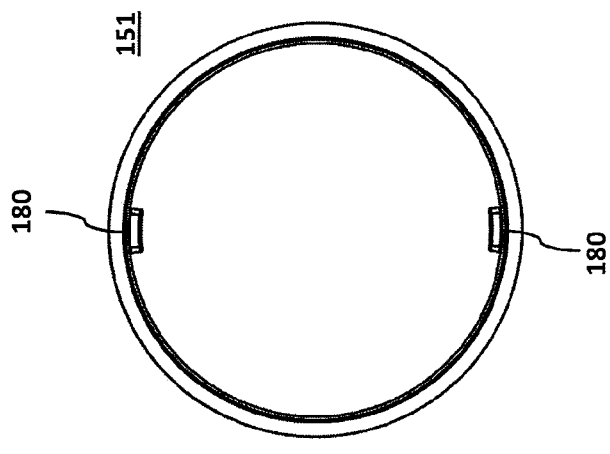
FIG. 15C illustrates a top plan view of the upstream housing of the second water filter.
Figure 15B:
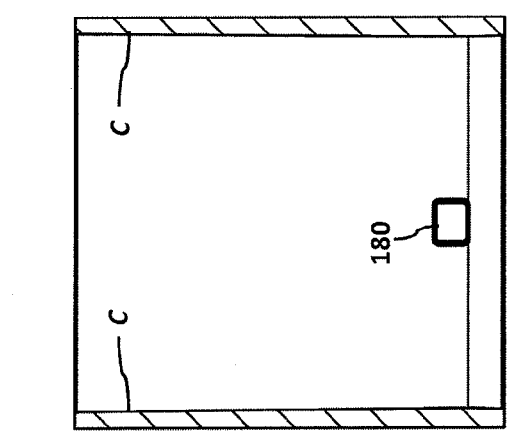
FIG. 15B illustrates a cross-sectional view of the upstream housing of the second water filter.
Figure 15A:
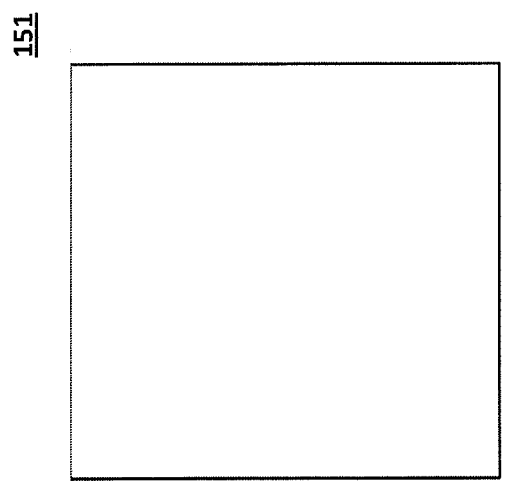
FIG. 15A illustrates a side view of an upstream housing of the second water filter.

With reference to FIGS. 15A through 15C, three views of the upstream housing 151 are illustrated. Specifically, FIGS. 15A and 15C illustrate side and top views while FIG. 15B illustrates a cross-sectional view of the upstream housing 151. As illustrated in FIGS. 15B and 15C, the inside surface of the upstream housing 151 may be provided with one or more tabs 180 configured to engage with the downstream housing 190's shaped slot 178, which functions as a guide channel.

To form the top cap assembly 176, adhesive, for example, may be placed around the inside circumference of the upstream end of the upstream housing 151. That is, on the end opposite the end having the one or more tabs 180 that engage the downstream housing 190, which is identified as surface C in FIG. 15B. A first end cap 131a may then be inserted into the upstream end of the upstream housing 151 containing the adhesive, thus bonding surface C of the upstream housing 151 with surface F of the first end cap 131a to create a water-tight seal.

The membrane cartridge 160 will be discussed with reference to FIGS. 16A through 16C. Specifically, FIG. 16A illustrates a side view of a membrane cartridge 160, while FIG. 16B illustrates a cross-sectional view and FIG. 16C illustrates a top plan view of the same. The membrane cartridge 160 houses the membrane bundle 187, or an equivalent thereof. Indeed, the filter cartridge 130 may employ any suitable water treatment technology to treat contaminated or potentially contaminated water so that it is potable (i.e., safe to drink In some embodiments, membranes, such as microporous membranes, or ultrafiltration membranes, are used in filter cartridge 130. Microfiltration membranes may refer to membranes having pores in the range of 0.1 to 10 microns. Ultrafiltration membranes may refer to membranes having pores in the range of 0.001 to 0.1 microns. In some embodiments, activated carbon is used in filter cartridge 130. In some embodiments, a chemical water treatment technology, such as chlorination, is used in filter cartridge 130. In some embodiments, a radiative water treatment technology, such as ultraviolet light, is used in the filter cartridge 130. In some embodiments, a combination of multiple water treatment technologies is used in filter cartridge 130.

The membrane bundle 187 may be potted inside the membrane cartridge 160 with potting resin at the open, upper end of the membrane cartridge. The membrane bundle 187 may occupy the entire inner cavity 161 of the membrane cartridge 160, or a substantial portion thereof. The potting resin forms a water-tight seal between the membrane bundle 187 and the wall of the membrane cartridge 160, thereby directing substantially all fluid through the membrane bundle 187. By directing fluid through the membrane bundle 187, as opposed to around it, filtering efficiency is increased. To reduce friction, one or more friction-reducing ribs 182 may be provided lengthwise along the membrane cartridge 160's outer surface. Openings between the supporting ribs 179 allow water to exit the membrane cartridge 160 at the downstream end.

To create a water-tight seal between the membrane cartridge 160 and downstream housing 190, an O-ring 163 (e.g., an AS568A-319 O-ring) may be placed into the radial gland 162 at the bottom of the membrane cartridge 160. As will be discussed in greater detail below, the membrane cartridge 160 further comprises an actuating protrusion 164 at the downstream end that may be used to actuate a flow valve. The actuating protrusion 164 may be adhered to, or integrated with, the membrane cartridge 160.

Figure 17B:
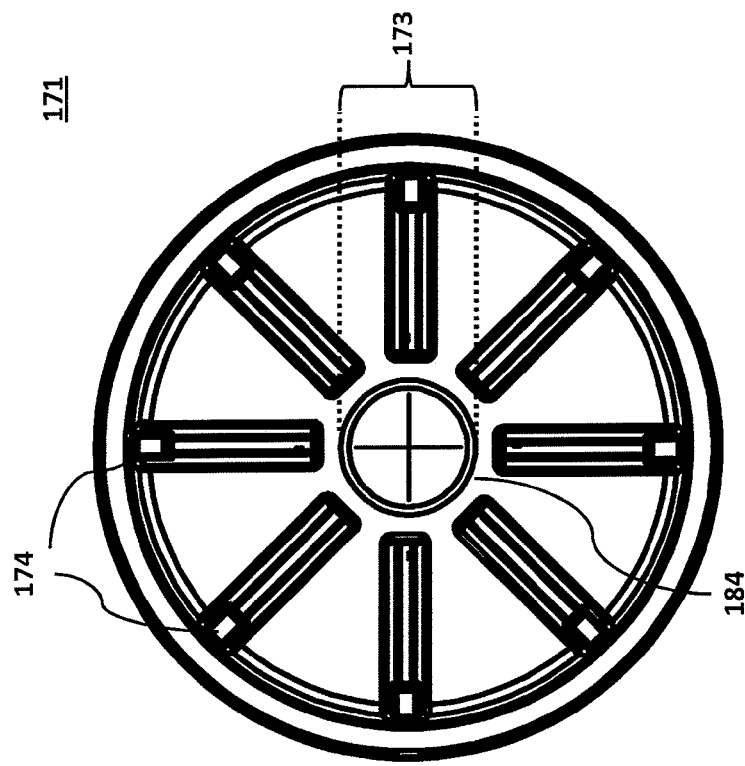
FIG. 17B illustrates a bottom plan view of the valve cap of the second water filter.
Figure 17A:
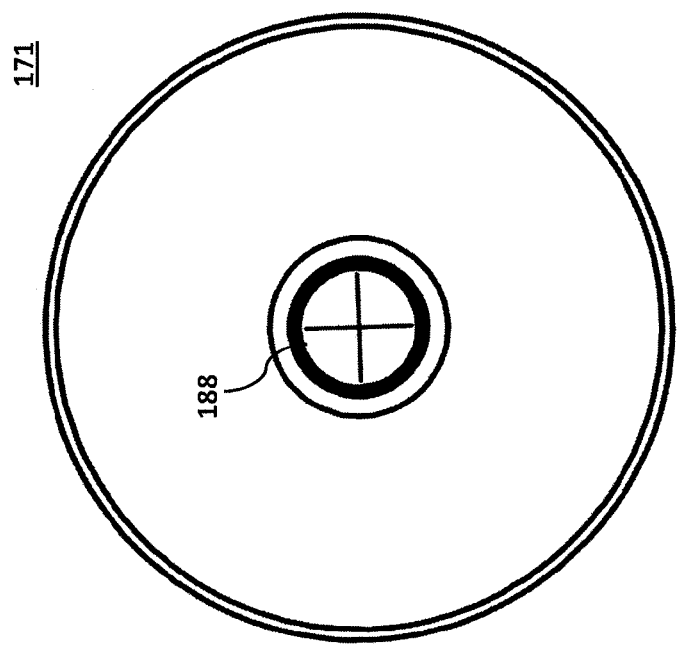
FIG. 17A illustrates a top plan view of a valve cap of the second water filter.
Figure 17D:
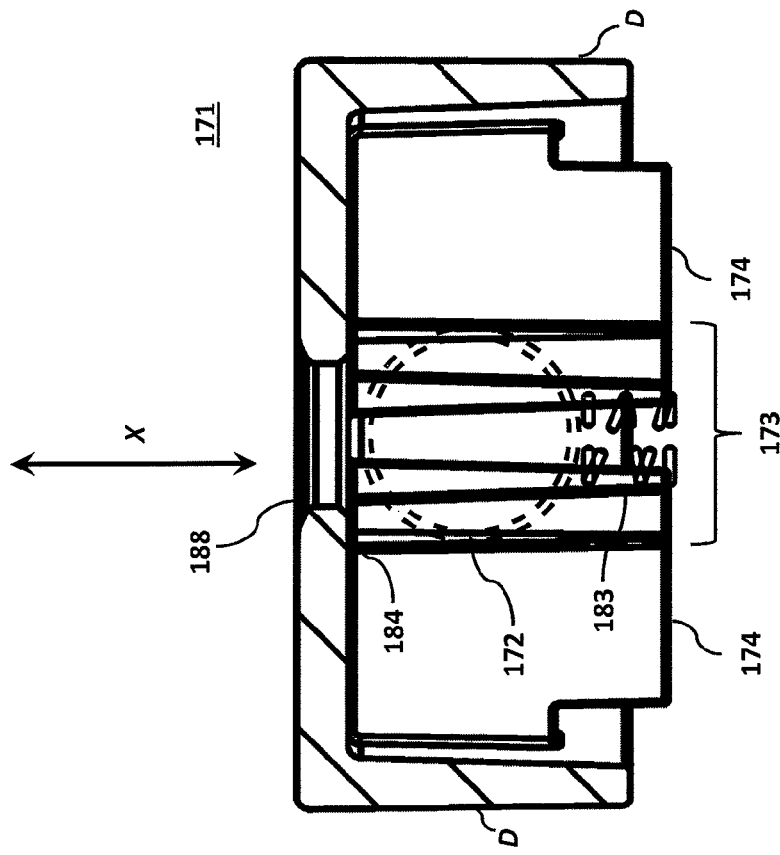
FIG. 17D illustrates a cross-sectional view of the valve cap of the second water filter.
Figure 17C:
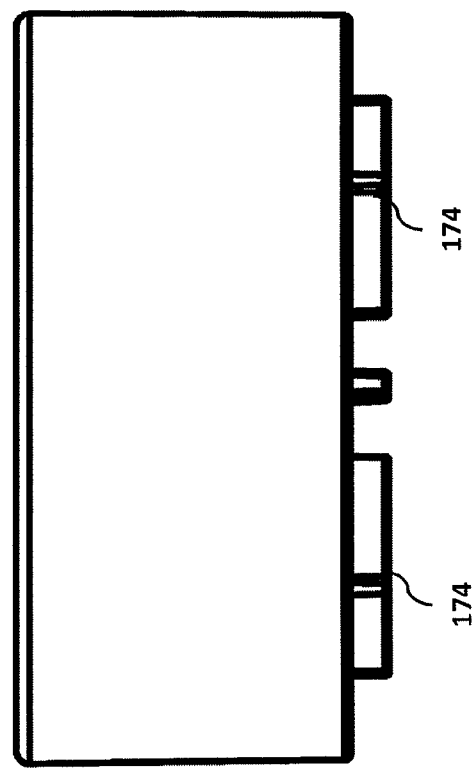
FIG. 17C illustrates a side view of the valve cap of the second water filter.

Details of the valve cap 171 will be discussed with reference to FIGS. 17A through 17D. FIGS. 17A through 17C illustrate top, bottom and side views of the valve cap 171, respectively, while FIG. 17D illustrate a cross-sectional view of the valve cap 171. With reference to FIG. 17D, a plunger ball 172 is placed into the valve cap 171 in the center annulus 173 defined by the radial protrusions 174 to provide a flow valve. The plunger ball 172 may be fabricated from, for example, plastic, rubber, and/or metal. A spring 183 may then be inserted into the center annulus 173 and placed on top of the plunger ball 172. The radial protrusions 174 guide the plunger ball 172 such that the plunger ball 172's motion can only be in the vertical direction (i.e., Direction X). Indeed, as noted above, the second end cap 131b may contain one or more radial protrusions 185 around the opening 186 on the inside surface that hold the spring 183 aligned in the axial position and prevent the spring 183 from blocking the opening, which would restrict the flow of water through the center opening 188.

To form the spring-and-ball valve assembly 175, adhesive may be placed on the inside of a second end cap 131b at surface B. The combination of the valve cap 171, spring 183 and plunger ball 172 may then be inserted into the second end cap 131b, thus bonding surface B of the second end cap 131b with surface D of the valve cap 171 to create a water-tight seal. Once assembled, the spring 183 generates a force that presses the plunger ball 172 into the radial valve seat 184 on the inside surface of the valve cap 171 when the filter is in the "off" position to create a water-tight seal. When the filter is in the "on" position, the actuating protrusion 164 on the end of the membrane cartridge 160 depresses or displaces the plunger ball 172 from the valve seat 184 by compressing the spring 183, thus allowing water to flow through the spring-and-ball valve assembly 175.

Figure 18D:
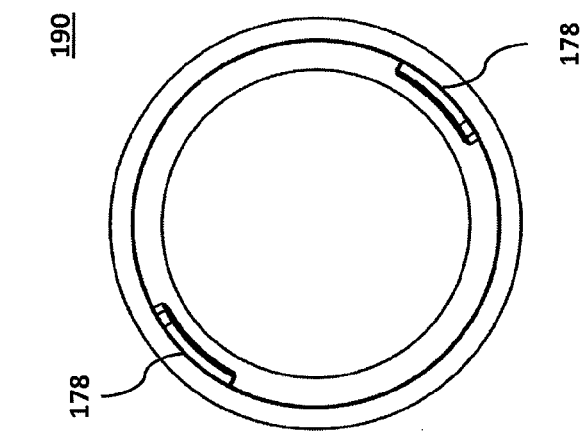
FIG. 18D illustrates a top plan view of the downstream housing of the second water filter.
Figure 18C:
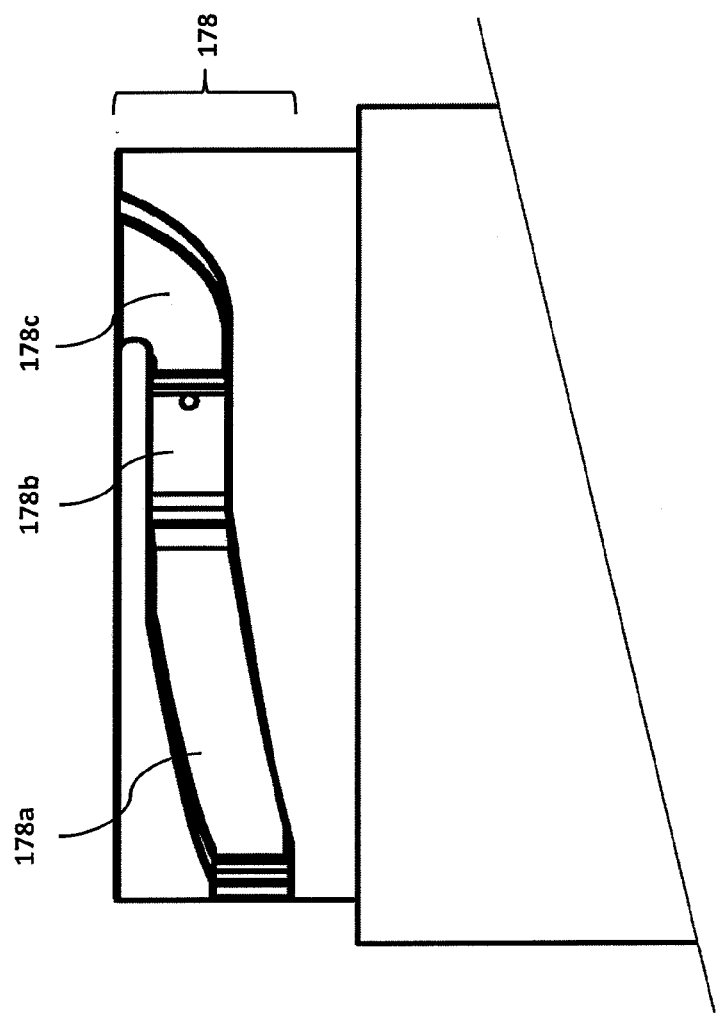
FIG. 18C illustrates a side view of the shaped slot of the second water filter.

The downstream housing 190 will now be described with reference to FIGS. 18A through 18D. Specifically, FIGS. 18A and 18B illustrate side and cross-sectional views, respectively, of the downstream housing 190 of the second water filter. As illustrated, the upstream end of the downstream housing 190 is configured to engage the top cap assembly 176, while the bottom end is configured to be adhered or fused with the spring-and-ball valve assembly 175.

Specifically, as illustrated in FIG. 18A, the downstream housing 190 is equipped with one or more shaped slots 178 configured to engage with the one or more corresponding tabs 180 on the top cap assembly 176. The one or more shaped slots 178 are positioned axially and circumferentially on the downstream housing 190. An enlarged view of a shaped slot 178 is provided in FIG. 18C. The shaped slot 178 enables the user to select between: (1) a first engagement position 178a (i.e., "on position"), which permits flow through the membrane and filter assembly; (2) a second engagement position 178b (i.e., "off position"), which prevents flow and seals the "clean end" of the filter assembly for storage; and (3) a third engagement position 178c (i.e., "unlocked position"), which allows the top cap assembly 176 to disengage from the downstream housing 190 and allows the user to pump the top cap assembly 176 and membrane cartridge to back-wash the membrane bundle 187.

During final assembly, the membrane cartridge 160 may be inserted into the widest end (i.e., downstream end) of the downstream housing 190, until the upstream end of the membrane cartridge 160 protrudes from the downstream housing 190 by, for example, two inches from the narrow end (i.e., upstream end) of the downstream housing 190, which enables the user to adhere the top cap assembly 176. A lubricant, such as silicone, polytetrafluoroethylene (e.g., Teflon) or another water- and food-safe lubricant, may be placed inside the downstream housing 190 at a location several centimeters from the downstream end, prior to assembly, to help facilitate assembly and overall function of the filter.

Next, adhesive may be placed on the outside circumference of the membrane cartridge 160 at surface A. The top cap assembly 176 may then be inserted onto the membrane cartridge 160, thus bonding the two assemblies together and creating a water-tight seal. Specifically, the inner surface B of the end cap 131 may be bonded with the outer circumference surface A of the upstream end of the membrane cartridge 160. As noted above, the one or more standoff protrusions 181 may be provided on the inner surface of the end cap 131 to maintain a gap between membrane cartridge 160 and end cap 131. More specifically, the one or more standoff protrusions 181 prevent the membrane cartridge 160 from mating against the flat surface of the end cap 131a, which would prevent water from entering the membrane bundle 187. Furthermore, as noted above with reference to FIG. 16b, an O-ring 163 may be placed into the radial gland 162 at the bottom of the membrane cartridge 160 to create a water-tight seal between the membrane cartridge 160 and downstream housing 190.

Finally, adhesive may be placed around the inside circumference of the wide end of the downstream housing 190 at surface E. The spring-and-ball valve assembly 175 may then be inserted into the downstream housing 190, thus bonding surface F of the second end cap 131b with surface E of the downstream housing 190 to create a water-tight seal.

The top cap assembly 176 is then depressed toward the downstream housing 190 and rotated until the tabs 180 on the inside surface of the top cap assembly 176 engage with the shaped slot 178 on the downstream housing 190. At this point, the filter cartridge 130 assembly is now functional and difficult to disassemble without causing damage.

To provide an overview, the second embodiment may be illustrated by the following Example. This Example is provided to aid in the understanding of the invention and is not to be construed as a limitation thereof. Referring to FIGS. 19A-21A, a sequence of operations performed in the back-washing of the filter cartridge 130 is illustrated. As discussed above, back-washing may be performed as frequently or as infrequently as desired by users of the filter cartridge 130, based upon the cleanliness of the water being treated and the acceptable rate of flow through the filter cartridge 130.

Figures 19C, 19D:
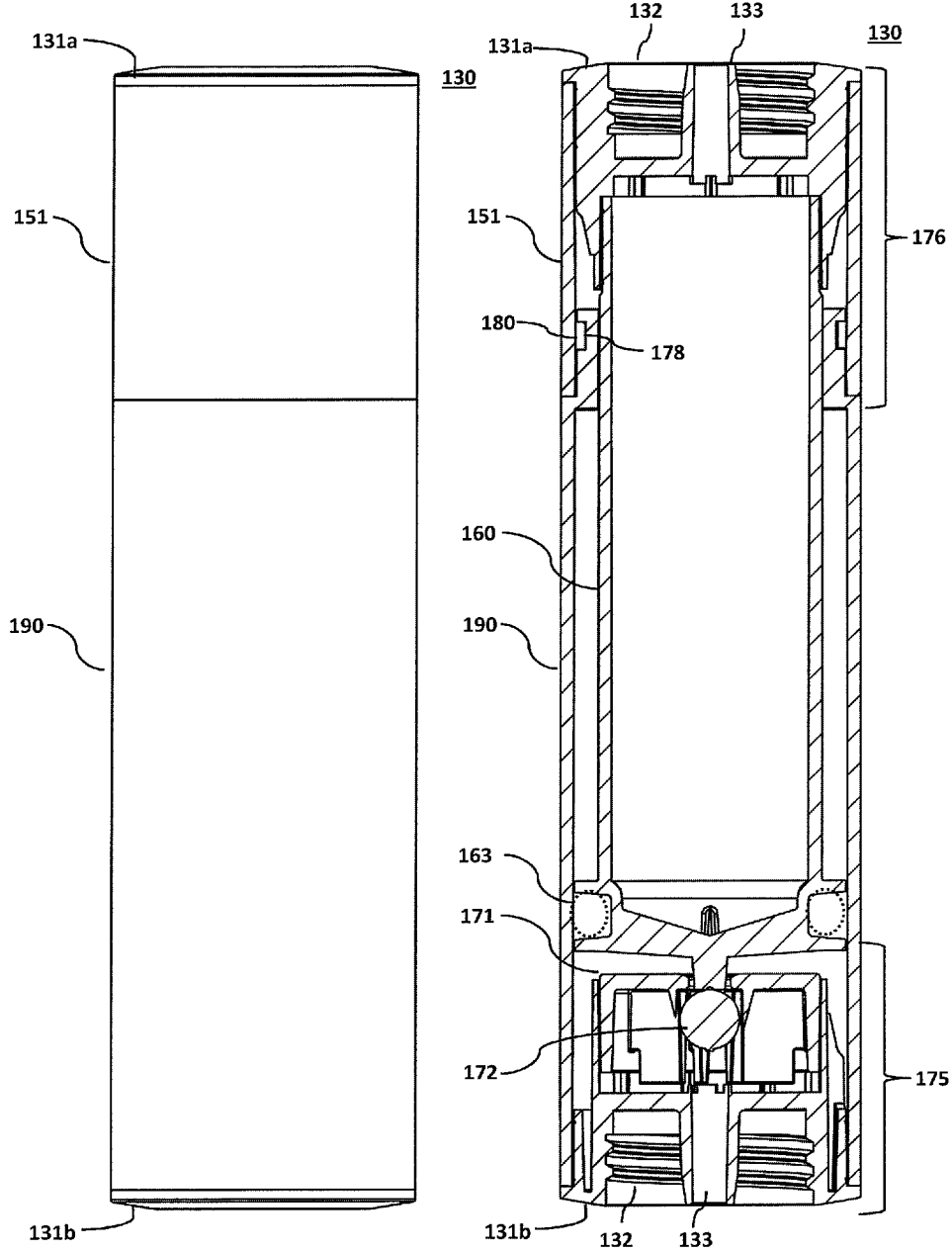
FIG. 19C illustrates a side view of the second water filter in an open position.
FIG. 19D illustrates a cross-sectional view of the second water filter in an open position.

Turning specifically to FIG. 19A, a perspective view of the second filter cartridge 130 is shown in a first position (i.e., an open position). The filter cartridge 130 is shown in the first flow configuration with the downstream housing 190 abutting the upstream housing 151. In the first position, the filter cartridge 130 is "on," meaning that water can enter from the top, flow through the porous membrane inside, and exit at the bottom via the "clean end." The normal direction of flow during filtration is from top to bottom, whereby the top end of the filter is the "dirty end" and the bottom is the "clean end." FIG. 19B illustrates the first engagement position of the shaped slot 178 and the relative location of the top cap assembly 176's tab 180 while in the first flow configuration. Finally, FIG. 19C illustrates a side view, while FIG. 19D illustrates a cross-sectional view of the second water filter in an open position. Turning now to FIG. 19D, note that the actuating protrusion 164 provides a downward force against the plunger ball 172 such that the plunger ball 172 is pushed away from the valve seat 184, thereby actuating the flow valve by breaking the water-tight seal and allowing fluid to freely flow between the valve cap 171 and membrane cartridge 160.

Figure 20B:
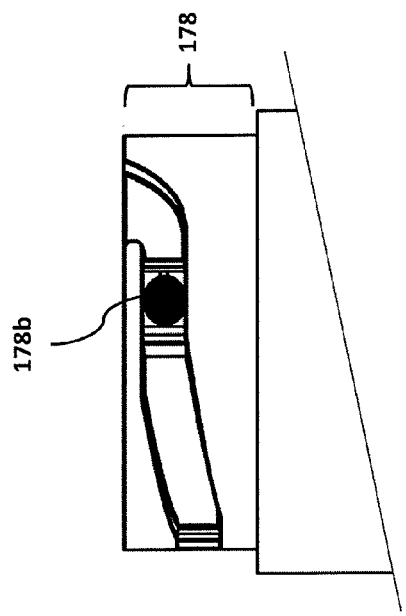
FIG. 20B illustrates a second engagement position of the tab in the shaped slot when the second water filter is in a closed position.
Figure 20A:
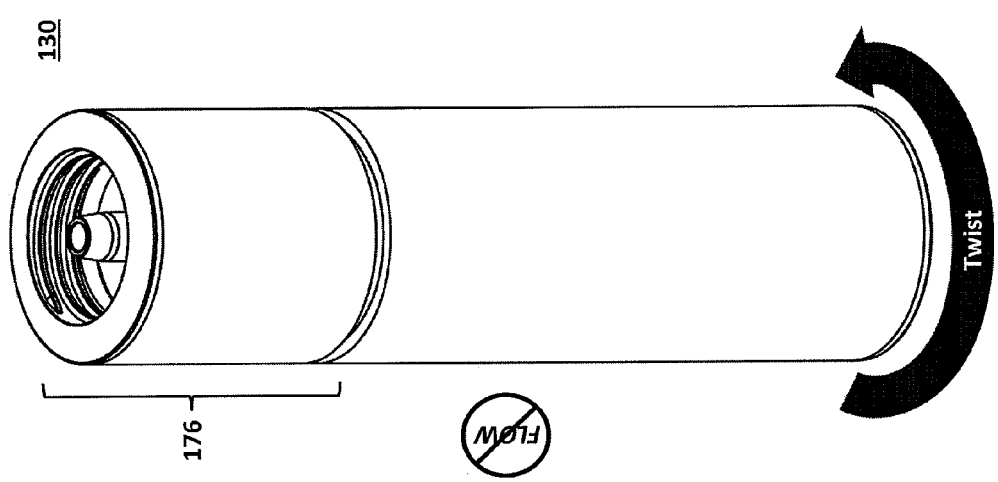
FIG. 20A illustrates a perspective view of the second water filter in a closed position.

FIG. 20A illustrates a perspective view of the second filter cartridge 130 in a second position (i.e., a closed position). In the second position the filter is "off," meaning the flow of water is stopped. Rotation of the downstream housing 190 about the central axis of the filter cartridge 130 in an off direction (as indicated by the arrow), causes the upstream housing 151 to slightly disengage from the downstream housing 190. This allows the spring-loaded plunger ball 172 to be seated in the valve cap 171, thus creating a water-tight seal, thereby blocking the flow of water through the valve cap 171. FIG. 20B illustrates the second engagement position of the shaped slot 178 and the relative location of the top cap assembly 176's tab 180 while in the second flow configuration. FIG. 20C illustrates a side view, while FIG. 20D illustrates a cross-sectional view of the second water filter in a closed position. Turning now to FIG. 20D, note that the actuating protrusion 164 has been retracted, thus removing the downward force from the plunger ball 172, thereby allowing the spring 183's upward force to push the plunger ball 172 toward the valve seat 184, thereby closing the flow valve by creating a water-tight seal and prohibiting fluid from flowing between the valve cap 171 and membrane cartridge 160.

FIG. 21A illustrates a perspective view of the second filter cartridge 130 in a third position (i.e., an unlocked position). Rotation of the downstream housing 190 about the central axis of the filter cartridge 130 in an unlocking direction (as indicated by the arrow) causes the upstream housing 151 to disengage from the downstream housing 190. This allows the downstream housing 190 to move axially relative to the upstream housing 151 in the extension direction 101, as illustrated in FIG. 21A. FIG. 21B illustrates the third engagement position of the shaped slot 178 and the relative location of the top cap assembly 176's tab 180 while in the third flow configuration. FIG. 21C illustrates a side view, while FIG. 21D illustrates a cross-sectional view of the second water filter in an unlocked position. Turning now to FIG. 21D, note that, as in the second position, the actuating protrusion 164 remains retracted and the water-tight seal is maintained (i.e., the flow valve is closed).

However, unlike the second position, the filter cartridge 130 is "unlocked" in the third position, thereby allowing the top section to be pumped up 102 and down 101 relative to the bottom section by the user, as indicated by the arrows. As discussed in relation to the filter cartridge 30 of the first embodiment, the pumping action of filter cartridge 130 can serve the purposes of: (1) back-washing the membrane; (2) starting the siphon; and (3) clearing out any bubbles that cause airlock.

It should be noted that, although the membrane is described illustratively in this embodiment, other types of back-washable filtration media may be used without departing from the function of the filter as described in connection with this embodiment. Moreover, while three flow configurations are described, it is contemplated that fewer, or additional, flow configurations may be incorporated with the filter cartridge 130. For instance, the second position may be omitted, if desired, since the valve is also closed during the third position.

FIGS. 22-27 illustrate filter cartridges according to a plurality of additional embodiments. Because the basic functionality of the filter cartridge of the plurality of additional embodiments are similar to the filter cartridges 30, and 130 of the first and second embodiments, for brevity, common elements and features will not be discussed at length because they may obscure the invention with unnecessary detail. Similarly, as discussed above, the pumping action can serve the purposes of: (1) back-washing the membrane; (2) starting the siphon; and (3) clearing out any bubbles that cause airlock.

Figure 22:
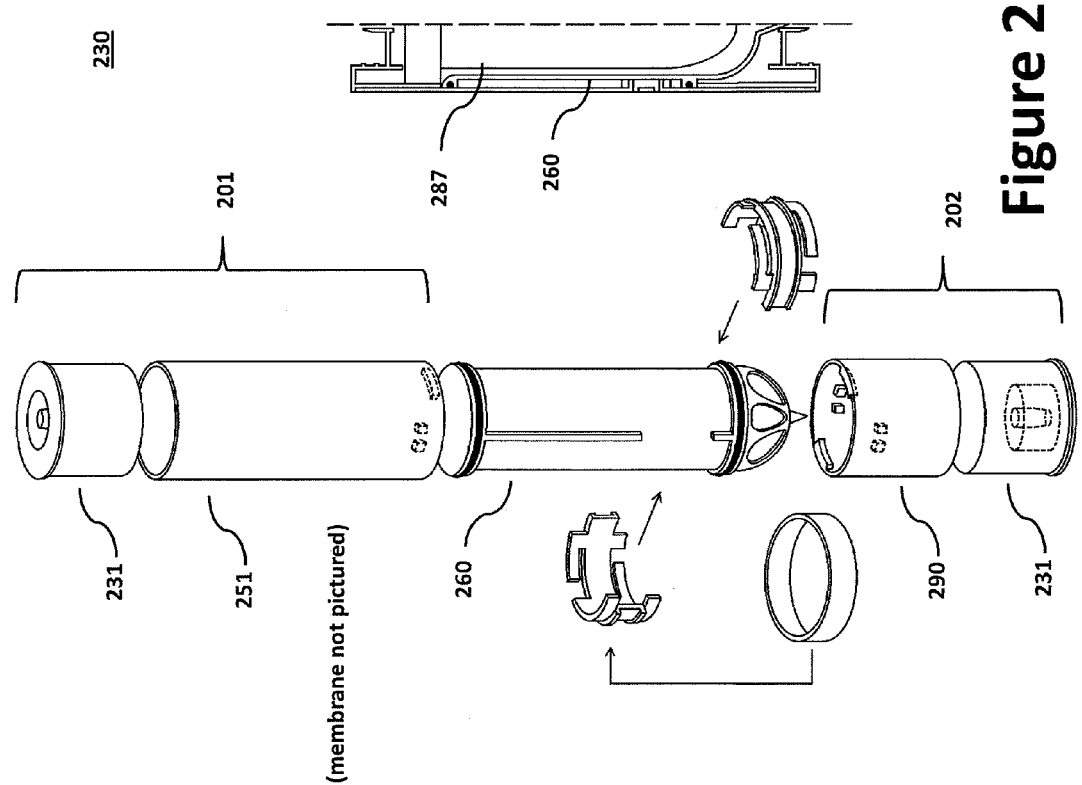
FIG. 22 illustrates a third embodiment of a water filter of the water filtration device.

Turning now to FIG. 22, a filter cartridge 230 of a third embodiment may be controlled by positioning a ring, optionally constructed from multiple parts for ease of manufacture, which can be positioned to selectively hold or release an upper assembly 201 and a lower assembly 202. The upper assembly 201 generally comprises the upstream housing 251 and end cap 231, while the lower assembly 202 generally comprises the downstream housing 290 and end cap 231. Those skilled in the art will recognize that while one such ring is pictured, there are multiple configurations that achieve comparable functionality. When the ring is in a first position, the upper assembly 201 is held and the lower assembly 202 is released. This allows the lower assembly 202 to extend, thus unplugging an exit valve so water can pass through the filter via the filter membrane 287 within the membrane cartridge 260. When the ring is in a second position, the upper assembly 201 is released and the lower assembly 202 is held. This holds the exit valve shut while allowing the upper assembly 201 to extend and retract, which constitutes a multi-functional pumping motion to back-wash the membrane 287, start a siphon, or clear any bubbles causing airlock. The closed exit valve in this position ensures that the extension and retraction of the upper assembly causes flow back and forth through the filter's inlet, while no flow occurs through the filter's outlet. When the ring is in a third position, both the upper assembly and the lower assembly are held. This holds the filter is in a closed or "off" position, so no water can flow, and no pumping can take place.

Figure 23:
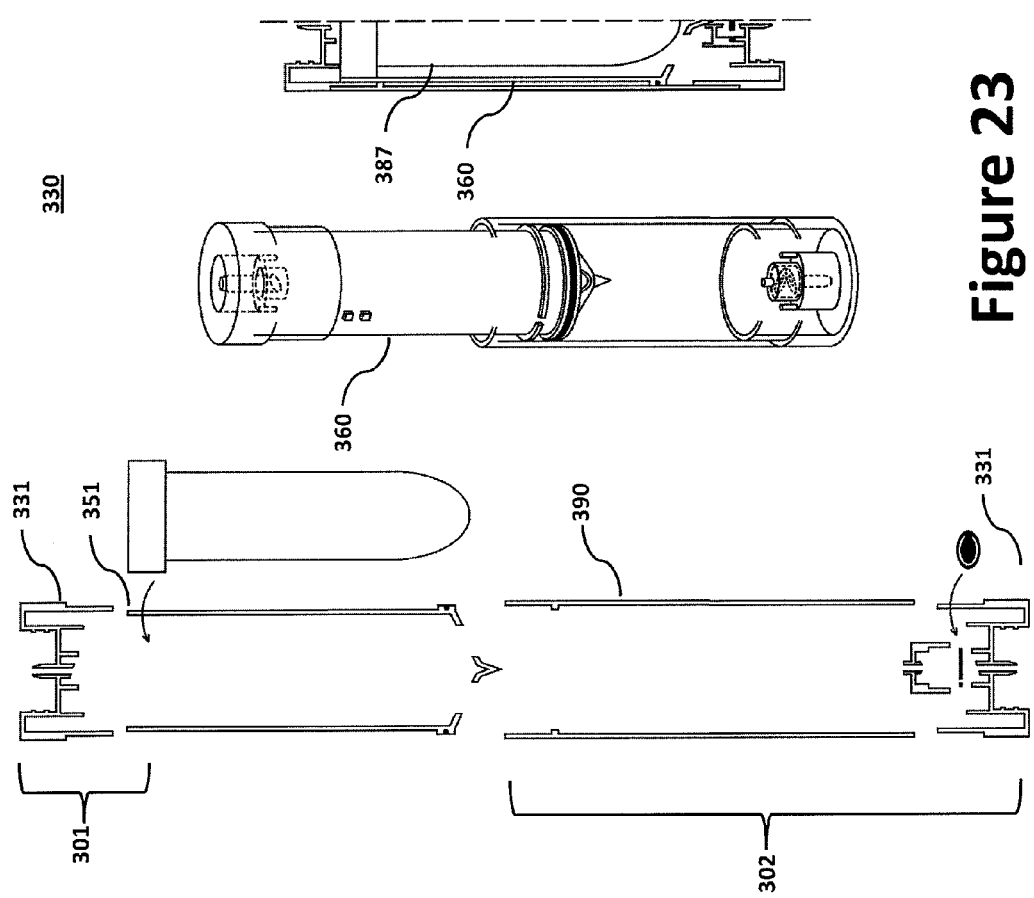
FIG. 23 illustrates a fourth embodiment of a water filter of the water filtration device.

Turning now to FIG. 23, a filter cartridge 330 of a fourth embodiment may be controlled by positioning an upper assembly 301, the upper assembly 301 having various tabs that can selectively hold the upper assembly 301 in various positions or release the upper assembly 301 to extend and retract. The upper assembly 301 generally comprises the upstream housing 351 and end cap 331, while the lower assembly 302 generally comprises the downstream housing 390 and end cap 331. The filter cartridge 330 also has a two-directional flow-controlled valve. The valve has a spring (which may be built-in or a separate component) that tends to return it to a resting position in which it does not block flow, unless the flow in either direction is strong enough to deflect the valve such that it blocks flow. Those skilled in the art will recognize that while one such valve is pictured, there are multiple configurations that achieve comparable functionality. The filter also has an annular interference valve that is optionally opened or closed by a plug extending from the upper assembly 301. When the upper assembly 301 is in a first position, the plug is positioned to not block the annular interference valve so water can pass through the filter. When the upper assembly 301 is in a second position, the plug is positioned to block the annular interference valve so that water cannot pass through the filter. When the upper assembly 301 is in a third position, the upper assembly 301 is released so it can extend and retract, which constitutes a multi-functional pumping motion to back-wash the membrane 387 within the membrane cartridge 360, start a siphon, or clear any bubbles causing airlock. The extension and retraction of the upper assembly 301 generate sufficient pressure to activate the flow-controlled valve, such that the valve is closed during both extension and retraction of the upper assembly 301. This ensures that the extension and retraction of the upper assembly 301 causes flow back and forth through the filter's inlet, while no flow occurs through the filter's outlet.

Figure 24:
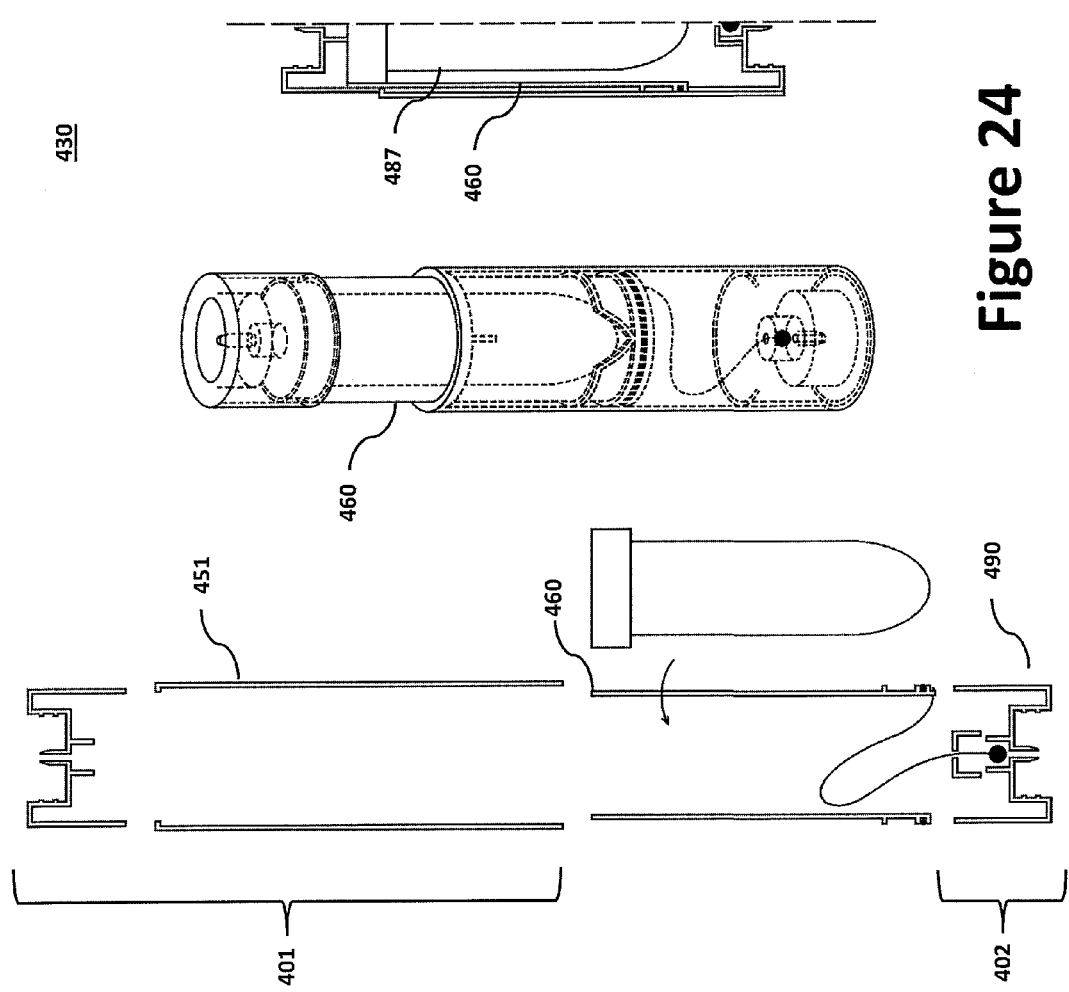
FIG. 24 illustrates a fifth embodiment of a water filter of the water filtration device.

Turning now to FIG. 24, a filter cartridge 430 of a fifth embodiment may be controlled by positioning an upper assembly 401, the upper assembly 401 having various tabs that can selectively hold the upper assembly 401 in various positions or release the upper assembly 401 from the lower assembly 402 to extend and retract. The filter also has a two-directional flow-controlled valve. The valve is attached to a tension member that can selectively hold the valve in a neutral position, so as to not block the flow of water leaving the filter. The flow-controlled valve may be configured to block all flow in the reverse direction, so that the user can never accidentally drive water through the valve in the reverse direction. This is beneficial because it reduces the risk of accidental misuse of the filter. Those skilled in the art will recognize that while one such valve is pictured, there are multiple configurations that achieve comparable functionality. When the upper assembly 401 is in a first, fully extended, position, the tension member is engaged to hold the valve in the neutral position, so as to not block the flow of water leaving the filter. In the first position water can pass through the filter. When the upper assembly 401 is in a second, fully retracted, position, the tension member is not engaged to hold the valve in the neutral position, so the flow-controlled valve is free to block the flow of water leaving the filter. In the second position water cannot pass through the filter. When the upper assembly 401 is in a third position, the upper assembly 401 is released so it can extend and retract, which constitutes a multi-functional pumping motion to back-wash the membrane 487 within the membrane cartridge 460, start a siphon, or clear any bubbles causing airlock. The extension and retraction of the upper assembly 401 generate sufficient pressure to activate the flow-controlled valve, such that the valve is closed during both extension and retraction of the upper assembly 401. This ensures that the extension and retraction of the upper assembly 401 causes flow back and forth through the filter's inlet, while no flow occurs through the filter's outlet.

Figure 25:
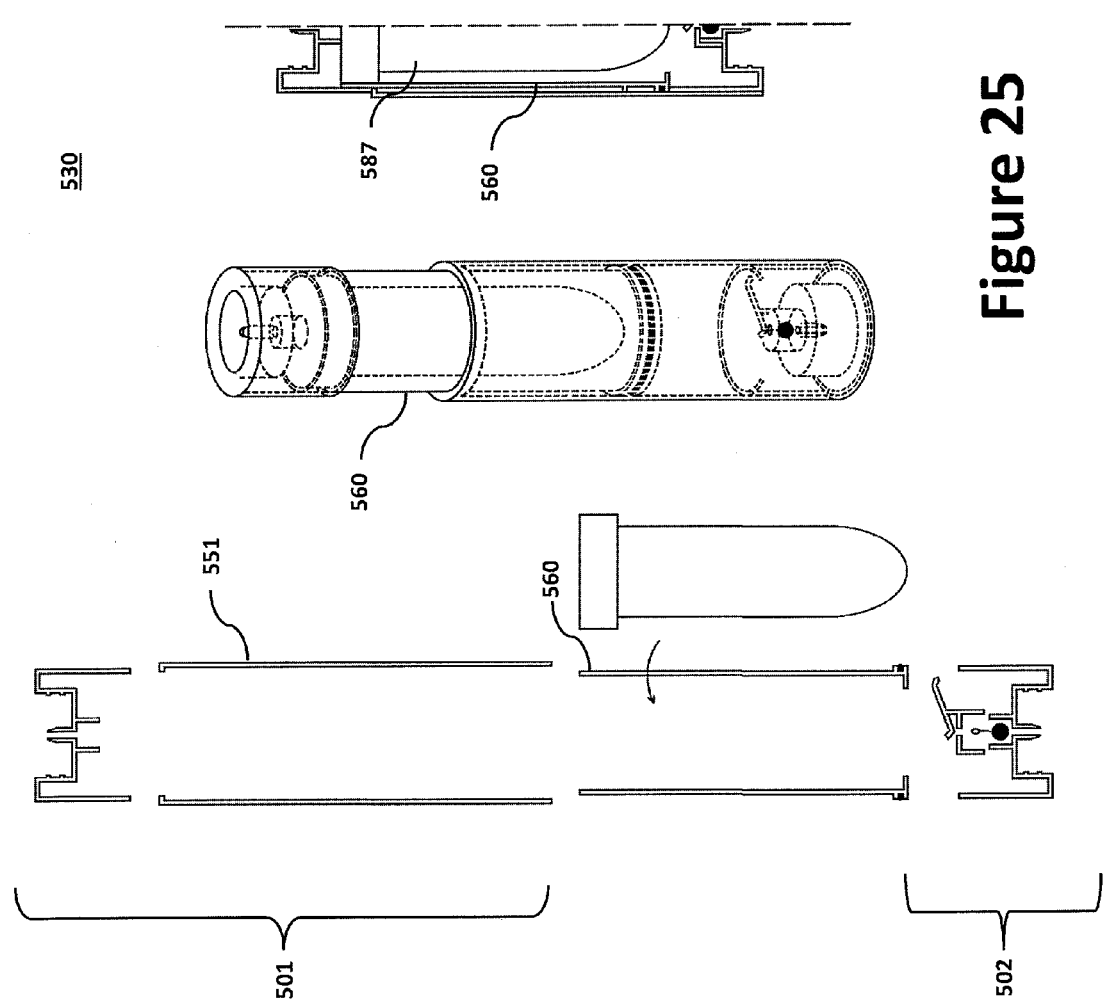
FIG. 25 illustrates a sixth embodiment of a water filter of the water filtration device.

Turning now to FIG. 25, a filter cartridge 530 of a sixth embodiment may be controlled by positioning an upper assembly 501, the upper assembly 501 having various tabs that can selectively hold the upper assembly 501 in various positions or release the upper assembly 501 from the lower assembly 502 to extend and retract. The filter also has a two-directional flow-controlled valve. The valve is attached to a tension member that can selectively hold the valve in a neutral position, so as to not block the flow of water leaving the filter. The flow-controlled valve may be configured to block all flow in the reverse direction, so that the user can never accidentally drive water through the valve in the reverse direction. This is beneficial because it reduces the risk of accidental misuse of the filter. Those skilled in the art will recognize that while one such valve is pictured, there are multiple configurations that achieve comparable functionality. When the upper assembly 501 is in a first, fully retracted, position, the tension member is engaged to hold the valve in the neutral position, so as to not block the flow of water leaving the filter. In the first position water can pass through the filter. When the upper assembly 501 is in a second, fully extended, position, the tension member is not engaged to hold the valve in the neutral position, so the flow-controlled valve is free to block the flow of water leaving the filter. In the second position water cannot pass through the filter. When the upper assembly 501 is in a third position, the upper assembly 501 is released so it can extend and retract, which constitutes a multi-functional pumping motion to back-wash the membrane 587 within the membrane cartridge 560, start a siphon, or clear any bubbles causing airlock. The extension and retraction of the upper assembly 501 generate sufficient pressure to activate the flow-controlled valve, such that the valve is closed during both extension and the retraction of the upper assembly 501. This ensures that the extension and retraction of the upper assembly 501 causes flow back and forth through the filter's inlet, while no flow occurs through the filter's outlet.

Figure 26:
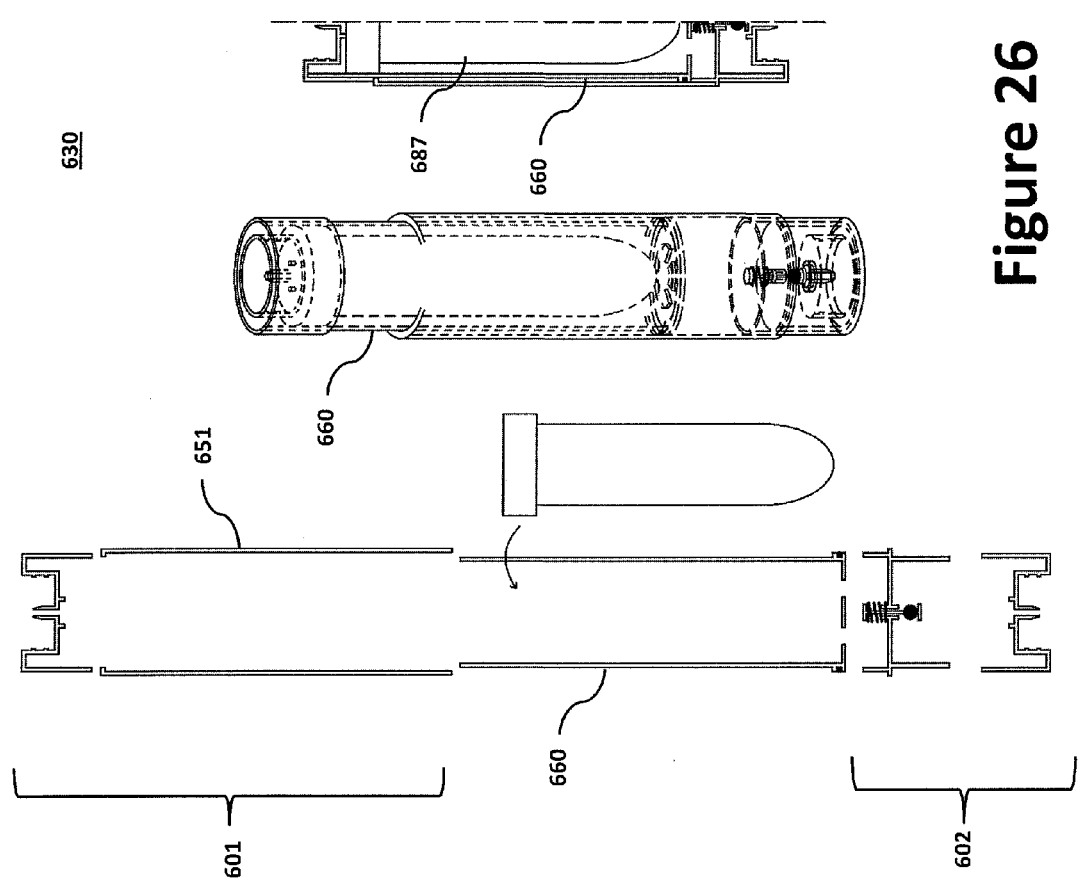
FIG. 26 illustrates a seventh embodiment of a water filter of the water filtration device.

Turning now to FIG. 26, a filter cartridge 630 of a seventh embodiment may be controlled by positioning an upper assembly 601, the upper assembly 601 having various tabs that can selectively hold the upper assembly 601 in various positions or release the upper assembly 601 from the lower assembly 602 to extend and retract. The filter also has a valve. A spring holds the valve against its seat, except when the valve is engaged by the upper assembly 601, overcoming the spring force and opening the valve. The flow-controlled valve may be configured to block all flow in the reverse direction, so that the user can never accidentally drive water through the valve in the reverse direction. This is beneficial because it reduces the risk of accidental misuse of the filter. Those skilled in the art will recognize that while one such valve is pictured, there are multiple configurations that achieve comparable functionality. When the upper assembly 601 is in a first, fully retracted, position, the valve is engaged by the upper assembly 601, thus opening the valve, so as not to block the flow of water leaving the filter. In the first position water can pass through the filter. When the upper assembly 601 is in a second position, the valve is not engaged by the upper assembly 601, so the valve is held against its seat by the spring force. In the second position water cannot pass through the filter. When the upper assembly 601 is in a third position, the upper assembly 601 is released so it can extend and retract, which constitutes a multi-functional pumping motion to back-wash the membrane 687 within the membrane cartridge 660, start a siphon, or clear any bubbles causing airlock. During the extension and retraction of the upper assembly 601, the valve is held against its seat by the spring force, such that the valve is closed during both extension and retraction of the upper assembly 601. This ensures that the extension and retraction of the upper assembly 601 causes flow back and forth through the filter's inlet, while no flow occurs through the filter's outlet.

Turning now to FIG. 27, a filter cartridge 730 of an eighth embodiment may be controlled by positioning an upper assembly 701, the upper assembly 701 having tabs that can selectively hold the upper assembly 701 in various positions or release the upper assembly 701 from the lower assembly 702 to extend and retract. The filter also has an annular interference valve which can be selectively engaged by the upper assembly 701. The plug of the annular interference valve has tabs that move within a shaped slot or channel such that rotating the plug of the annular interference valve causes the assembly to selectively block or not block the flow of water. When the upper assembly 701 is in a first position, the plug of the valve is engaged by the upper assembly 701 to not block the flow of water leaving the filter. In the first position water can pass through the filter. When the upper assembly 701 is in a second position, the plug of the valve is engaged by the upper assembly 701 to block the flow of water leaving the filter. In the second position water cannot pass through the filter. When the upper assembly 701 is in a third position, the upper assembly 701 is released so it can extend and retract, which constitutes a multi-functional pumping motion to back-wash the membrane 787 within the membrane cartridge 760, start a siphon, or clear any bubbles causing airlock. During the extension and retraction of the upper assembly 701, the plug of the valve is held such that the flow of water is blocked. This ensures that the extension and retraction of the upper assembly 701 causes flow back and forth through the filter's inlet, while no flow occurs through the filter's outlet.

As illustrated in FIGS. 28*a* through 28*d*, it may be advantageous in certain embodiments to provide one or more surface protrusions 280 on an outer surface of the housings 890, 851. The surface protrusions 280 prevent the filter cartridge 830 from easily rolling when placed on a flat surface, thereby reducing the risk of damage that can result from the filter cartridge 830 rolling off of a table or counter top. The surface protrusions 280 may be used in conjunction with any of the above-described embodiments. For example, the one or more surface protrusions 280 may be placed on the downstream housing 890 (as illustrated), the upstream housing 851, the end caps, or a combination thereof. In fact, plural surface protrusions 280 may be placed along the entire circumference of the filter cartridge 830, or a portion thereof. While oval surface protrusions 280 are illustrated, it is anticipated that other shapes may be used to facilitate a particular design or aesthetic need. For example, each surface protrusion 280 may be in the shape of an alphanumeric character, which would collectively spell out a brand name, message, capacity, etc. The protrusions may even be square, circular or domed in shape (or any other ornamental shape, i.e., a water droplet).

Figure 28A:
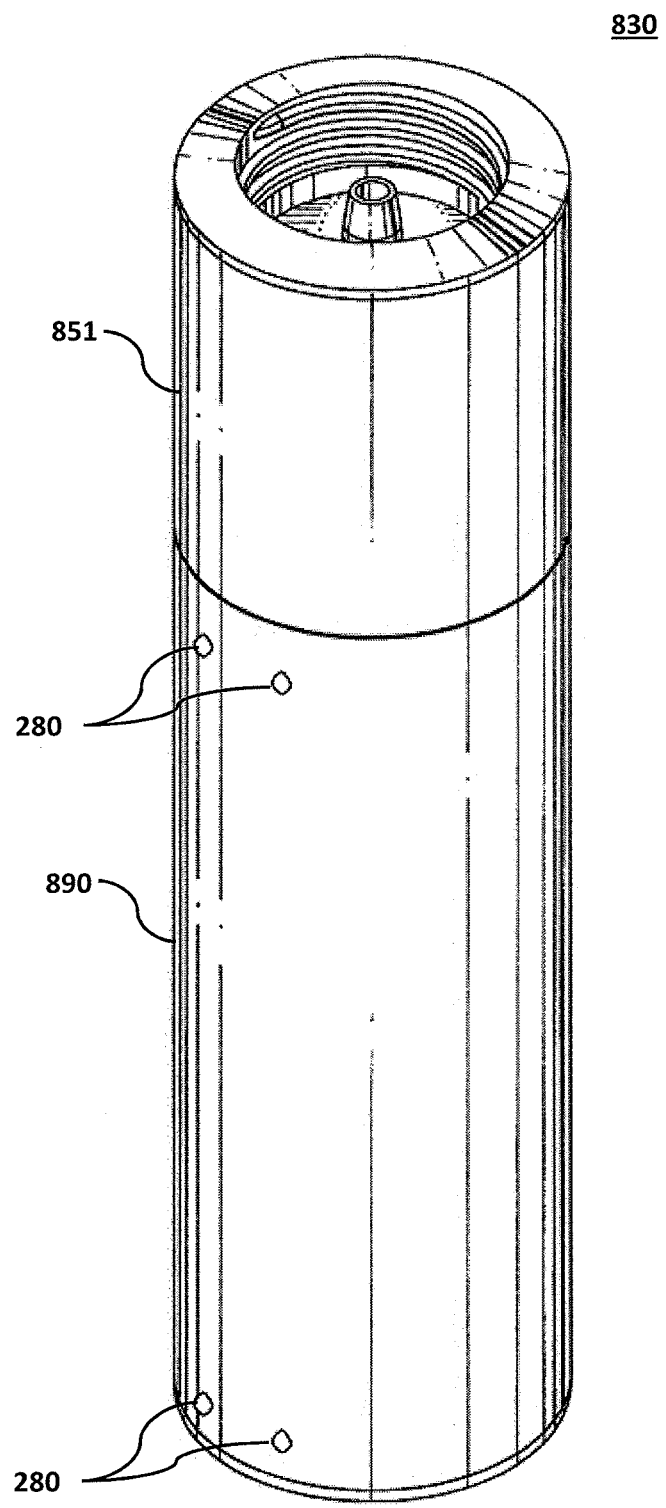
Figure 28D:
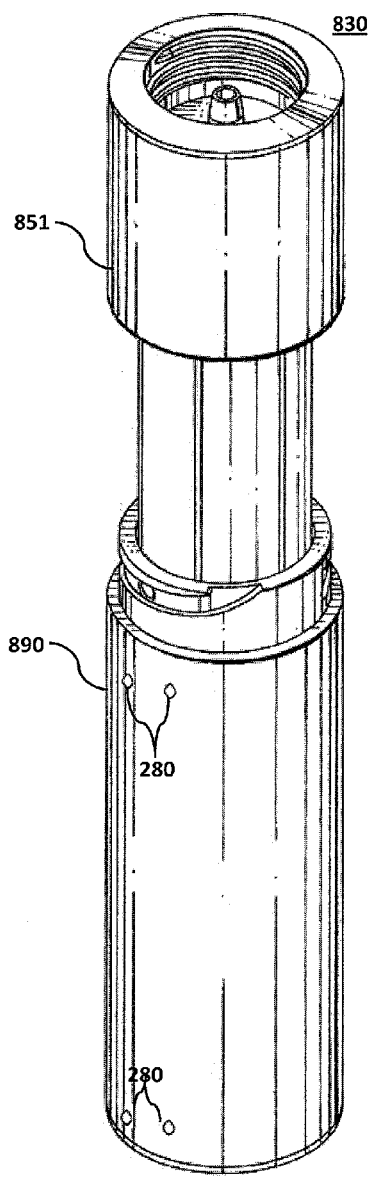
Figure 28E:
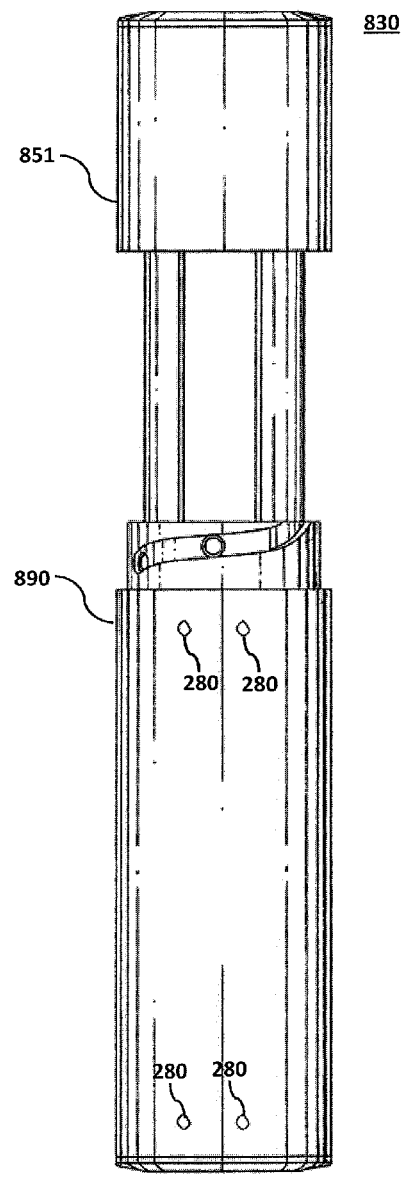

As illustrated in FIG. 28e, by placing the protrusions on the backside of the filter, the filter will come to a rest such that the product trademark, wordmark, images and/or function position indicators are facing toward the user, thereby making the features more readily visible. As used herein, backside of the filter refers to the surface of the filter opposite from the surface ornamentation that displays, for example, the product trademark, wordmark, images and/or function position indicators. Alternately, the protrusions may be placed on the front of the filtration device and also be incorporated into the surface ornamentation. When two protrusions are placed at the same axial location but are separated radially by several degrees such that both protrusions are able to contact the hard surface simultaneously, the features serve as a stable base that prevents the filter from rolling when placed on a surface; by placing one or more additional pairs of protruding features at the opposite end of the filter, the resistance to rolling increases dramatically.

Alternatively, in lieu of surface protrusions 280, the filter cartridge 830 may employ an outer housing or other component (e.g., the end caps), having a non-circular cross-section, such as an oval or polygonal cross-section. For example, the outer housing's cross-section may be triangular, square, pentagonal, hexagonal, heptagonal, octagonal, etc. However, to facilitate the above described functions, such as the twisting and pumping action (e.g., back-flushing), the inner components, including the cartridge membrane and other inner components, may remain substantially circular, thereby allowing them to function (e.g., rotate) as needed.

As illustrated in FIGS. 29a and 29b, one or more anti-seal notches 2902 may be incorporated into the end cap 2900. The design of the filtration device allows the user the option to use a bottle (such as a plastic soda bottle) as the downstream vessel for collecting filtered water. Many plastic bottles contain flanges, plastic rings and other features that, when tightened securely against the outer face of the end cap, create an air-tight seal that prevents air from escaping the downstream vessel. As filtered water enters the vessel, an equal volume of air must be allowed to leave the vessel or the vessel will begin to pressurize; as the pressure in the vessel increases, the flow rate decreases and eventually stops. By placing one or more small notches or grooves around the outside edge of the threaded portion of the end cap a pathway is created that allows air traveling out of the vessel and through the threads of the end cap to bypass the flange, ring or other feature that would otherwise create a seal. These anti-seal grooves 2902 thus eliminate the possibility of pressuring the downstream vessel regardless of the vessel's design.

Figure 30A:
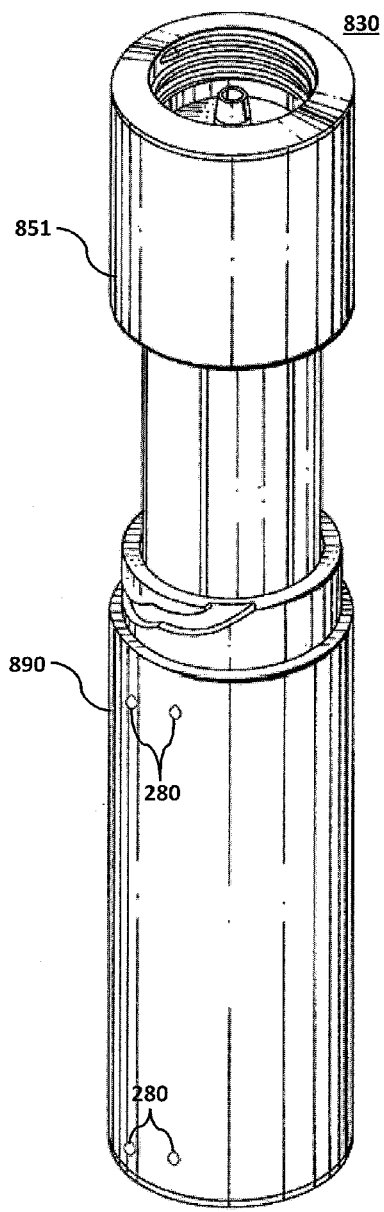
FIG. 30a-30b illustrate an embodiment of a water filter having a second guide channel design.
Figure 30B:
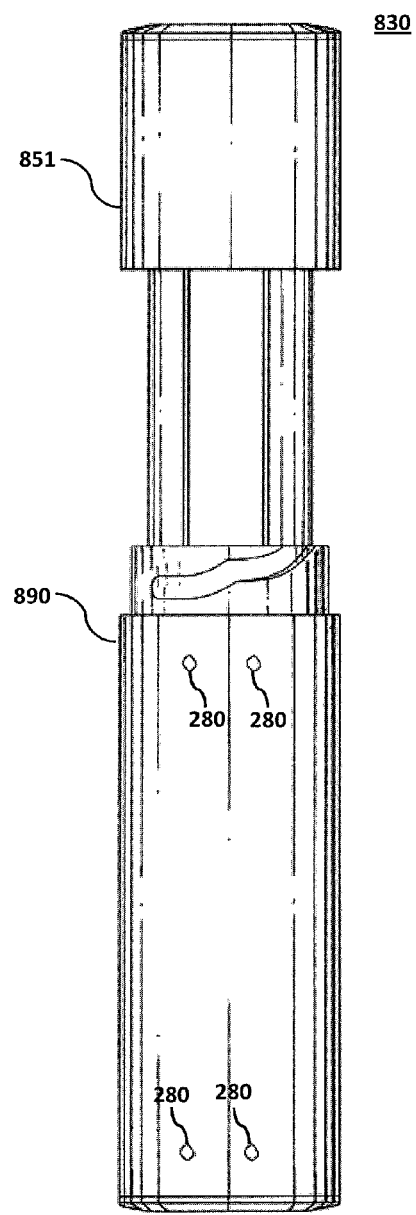

FIGS. 30a-30b illustrate an embodiment of a water filter having a second guide channel design. As discussed above, the downstream housing of the filtration device contains a channel/groove that engages with tabs located on the inside surface of the top cap. When the tabs are first engaged with the channel, the top cap and downstream housing are secured together such that there is no free movement in the axial direction. This position is referred to as 'OFF' as the membrane cartridge is not able to actuate the flow valve. When the top cap is rotated clockwise with respect to the downstream housing, the channel causes the top cap/membrane cartridge to move axially within the downstream housing, eventually activating the flow valve, which then allows water to flow through the device. This is referred to as the 'ON' position. It is beneficial to provide tactile feedback to the user when they are moving back and forth between the two positions, and when disengaging the tabs from the channel so that the filter may be back-washed (i.e., cleaned). By creating a deliberate direction change in the channel shape, the motion of the top cap is momentarily and noticeably interrupted, providing tactile feedback to the user to indicate the filter has been placed into the 'OFF' position.

The double-swept shape of the channel provides a secondary function that resolves a potential issue experienced with continuous incline channel shape (i.e., similar to a bottle thread). When the filter is placed into the 'ON' position, the spring inside of the valve exerts an upward force on the membrane cartridge and thus the top cap. If the tabs were engaged with an angled surface, the top cap would be able to rotate and move up in the channel due to the force, thus causing the valve to seal. By placing flat surfaces at both the 'ON' and 'OFF' positions, we prevent any axial force from causing the top cap to rotate out of the desired position.

A number of exemplary aspects and embodiments have been discussed above, and those of skill in the art will recognize certain modifications, permutations, additions and sub-combinations thereof. It is therefore intended that features introduced here are interpreted to include all such modifications, permutations, additions and sub-combinations as are within their true spirit and scope. Moreover, while the embodiments have been discussed in terms of filtering water, the above described embodiments may be applied to other fluids in addition to water.

What is claimed is:

1. A fluid treatment system comprising:
   an upstream portion adapted to (i) convey fluid and (ii) treat impurities within the fluid, said upstream portion having a filter; and
   a downstream portion in fluid communication with the upstream portion, wherein the downstream portion comprises a flow valve, and wherein the downstream portion is configured to selectably engage the upstream portion so as to change between, (1) a first engagement position, wherein the flow valve is in an open position, thereby enabling the fluid to flow through the downstream portion, and (2) a further engagement position, wherein the flow valve is in a closed position, thereby prohibiting the fluid from flowing through the downstream portion,
   wherein the upstream portion is configured to selectably extend from and retract to the downstream portion,
   whereby extending the upstream portion from the downstream portion causes the fluid to flow through the upstream portion in a downstream direction, whereby an amount of the fluid is retained within the downstream portion,
   whereby retracting the upstream portion causes said amount of the fluid to flow through the upstream portion in an upstream direction,
   wherein movement of the upstream portion with respect to the downstream portion causes the flow valve to move from the open position to the closed position,
   wherein extending the upstream portion drives the fluid in the downstream direction, and
   wherein retracting the upstream portion drives the fluid in the upstream direction, thereby (i) backwashing the upstream portion, (ii) clearing bubbles to mitigate risk of an airlock condition, and (iii) starting a siphon when used in conjunction with a hose in fluid communication with the upstream portion.

2. The fluid treatment system of claim 1, wherein the downstream portion is configured to selectably engage the upstream portion at yet another engagement position, in which the flow valve is in the closed position, thereby prohibiting fluid from flowing through the downstream portion, wherein the upstream portion is fixedly secured from extending and retracting relative to the downstream portion, wherein the yet another engagement position is an engagement position that is different from the first engagement position and the further engagement position.

3. The fluid treatment system of claim 1, wherein the downstream portion and the upstream portion alternate between the first engagement position and the further engagement position when the upstream portion is rotated relative to the downstream portion.

4. The fluid treatment system of claim 1, wherein the downstream portion and the upstream portion alternate between the first engagement position and the further engagement position when an intermediate portion positioned between the upstream portion and the downstream portion is rotated relative to the upstream portion and the downstream portion.

5. The fluid treatment system of claim 1, wherein the upstream portion and the downstream portion are cylindrical in shape and the upstream portion or the downstream portion comprise one or more surface protrusions to deter rolling.

6. The fluid treatment system of claim 1, wherein the upstream portion comprises an upstream threaded connector adapted to sealingly connect to an upstream threaded reservoir, and the downstream portion comprises a downstream threaded connector adapted to un-sealingly connect to a downstream threaded reservoir.

7. The fluid treatment system of claim 1, wherein the filter comprises a microfiltration membrane having hydrophilic and hydrophobic fibers.

8. The fluid treatment system of claim 1, wherein the filter comprises an ultrafiltration membrane having hydrophilic and hydrophobic fibers.

9. The fluid treatment system of claim 1, wherein said flow valve comprises a spring-and-ball valve assembly.

10. A back-washable fluid treatment apparatus comprising:
an upstream portion adapted to (i) convey fluid and (ii) treat impurities within the fluid, said upstream portion comprising a filter; and
a downstream portion in fluid communication with the upstream portion, wherein the downstream portion comprises a flow valve, and wherein the downstream portion is configured to selectably engage the upstream portion and alternate between, a first engagement position, wherein the flow valve is in an open position, thereby enabling the fluid to flow through the downstream portion, and a further engagement position, wherein the flow valve is in a closed position, thereby prohibiting the fluid from flowing through the downstream portion,
wherein the upstream portion is configured to selectably extend from and retract to the downstream portion,
whereby extending the upstream portion from the downstream portion causes the fluid to flow through the upstream portion in a downstream direction,
whereby an amount of the fluid is retained within the downstream portion, and retracting the upstream portion causes the fluid to flow through the upstream portion in an upstream direction, and
wherein movement of the upstream portion with respect to the downstream portion causes the flow valve to move from the open position to the closed position, wherein extending the upstream portion drives the fluid in the downstream direction, and
wherein retracting the upstream portion drives the fluid in the upstream direction, thereby (i) backwashing the upstream portion, (ii) clearing bubbles to mitigate risk of an airlock condition, and (iii) starting a siphon when used in conjunction with a hose in fluid communication with the upstream portion.

11. The back-washable fluid treatment apparatus of claim 10, wherein the downstream portion is configured to selectably engage the upstream portion at another engagement position, in which the flow valve is in the closed position, thereby prohibiting the fluid from flowing through the downstream portion, wherein the upstream portion is fixedly secured from extending and retracting relative to the downstream portion, wherein the another engagement position is an engagement position that is different from the first engagement position and the further engagement position.

12. The back-washable fluid treatment apparatus of claim 10, wherein the downstream portion and the upstream portion alternate between the first engagement position and the further engagement position when the upstream portion is rotated relative to the downstream portion.

13. The back-washable fluid treatment apparatus of claim 10, wherein the downstream portion and the upstream portion alternate between the first engagement position and the further engagement position when an intermediate portion positioned between the upstream portion and the downstream portion is rotated relative to the upstream and the downstream portion.

14. The back-washable fluid treatment apparatus of claim 10, wherein the upstream portion and the downstream portion are cylindrical in shape and the upstream portion or the downstream portion comprise one or more surface protrusions to deter rolling.

15. The back-washable fluid treatment apparatus of claim 10, wherein the starting of the siphon enables a fluid treatment to begin, and wherein every time the fluid treatment is begun, the starting of the siphon causes the backwashing and the clearing of the bubbles.

16. The back-washable fluid treatment apparatus of claim 10, wherein the filter comprises a microfiltration porous membrane having hydrophilic and hydrophobic fibers.

17. The back-washable fluid treatment apparatus of claim 10, wherein the filter comprises an ultrafiltration porous membrane having hydrophilic and hydrophobic fibers.

18. The back-washable fluid treatment apparatus of claim 10, wherein said flow valve comprises a spring-and-ball valve assembly.

19. A kit for filtering fluid comprising:
an upstream reservoir;
a downstream reservoir;
a membrane filter cartridge having an upstream end and a downstream end, wherein the membrane cartridge comprises an actuating protrusion at the downstream end;
an upstream housing having (i) the membrane filter cartridge, and (ii) an upstream end and a downstream end, wherein the downstream end of the upstream housing is fixedly connected to the upstream end of the membrane filter cartridge and comprises one or more tabs positioned circumferentially along an inner surface of the upstream housing, said membrane filter cartridge being configured to treat impurities in the fluid;
a downstream housing having an upstream end and a downstream end, wherein the upstream end of the downstream housing is movably connected to the downstream end of the membrane filter cartridge and comprises one or more shaped slots positioned circumferentially along the downstream housing's outer surface and configured to engage the upstream housing's one or more tabs;

wherein the downstream housing is configured to selectably engage the upstream housing and change between, (1) a first engagement position that permits the fluid to flow through the membrane filter cartridge, (2) a second engagement position that prevents the fluid from flowing, and (3) a third engagement position that allows the upstream housing to disengage from the shaped slots of the downstream housing thereby allowing a user to pump the upstream housing with respect to the downstream housing; and a valve cap positioned within said downstream housing, said valve cap having a flow valve configured to engage the actuating protrusion at the downstream end of the membrane cartridge, wherein movement of the upstream housing with respect to the downstream housing causes the flow valve to move from the open position to the closed position, wherein extending the upstream portion with respect to the downstream portion drives the fluid in the downstream direction, and wherein retracting the upstream housing with respect to the downstream housing drives the fluid in the upstream direction, thereby (i) backwashing the membrane filter cartridge, (ii) clearing bubbles to mitigate risk of an airlock condition, and (iii) starting a siphon when used in conjunction with a hose in fluid communication with the upstream housing.

20. The kit of claim 19, wherein: (i) the upstream housing comprises an inlet for receiving the fluid and an interior threaded portion around said inlet configured to provide a sealing engagement between said upstream housing and the upstream reservoir; and (ii) the downstream housing comprises an outlet for discharging the fluid and an interior threaded portion around said outlet configured to provide an un-sealing engagement between said downstream housing and the downstream reservoir.

* * * * *